United States Patent
Motoyoshi

(10) Patent No.: US 10,686,518 B2
(45) Date of Patent: Jun. 16, 2020

(54) COMMUNICATION SATELLITE, LINE CONTROL DEVICE, AND SATELLITE COMMUNICATION SYSTEM

(71) Applicant: Mitsubishi Electric Corporation, Tokyo (JP)

(72) Inventor: Katsuyuki Motoyoshi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 33 days.

(21) Appl. No.: 15/771,737

(22) PCT Filed: Dec. 25, 2015

(86) PCT No.: PCT/JP2015/086284
§ 371 (c)(1),
(2) Date: Apr. 27, 2018

(87) PCT Pub. No.: WO2017/109955
PCT Pub. Date: Jun. 29, 2017

(65) Prior Publication Data
US 2018/0316417 A1 Nov. 1, 2018

(51) Int. Cl.
*H04B 7/185* (2006.01)
*H04B 7/10* (2017.01)
(Continued)

(52) U.S. Cl.
CPC .......... *H04B 7/18523* (2013.01); *H04B 7/08* (2013.01); *H04B 7/0871* (2013.01); *H04B 7/10* (2013.01);
(Continued)

(58) Field of Classification Search
CPC .......... H04B 7/08; H04B 7/0871; H04B 7/10; H04B 7/155; H04B 7/185; H04B 7/18515;
(Continued)

(56) References Cited

U.S. PATENT DOCUMENTS

| 7,512,198 B2 | 3/2009 | Strodtbeck et al. |
| 2007/0207728 A1 | 9/2007 | Drakos |
| 2015/0180568 A1 | 6/2015 | Motoyoshi |

FOREIGN PATENT DOCUMENTS

JP 7-83305 B2 9/1995

OTHER PUBLICATIONS

Yun et al, Next Generation on Board Payload Architectures, IEEE, 5 pages, 2008.*
(Continued)

*Primary Examiner* — Frank Duong
(74) *Attorney, Agent, or Firm* — Birch, Stewart, Kolasch & Birch, LLP

(57) ABSTRACT

A communication satellite includes user beam antennas capable of forming user beams and feeder beam antennas capable of forming feeder link beams. The communication satellite includes demultiplexing units that divide a reception signal into up-user-link signals, multiplexing units that multiplex input signals and output the signals to feeder beam antennas, and a switch that duplicates an up-user-link signal on the basis of information determined for each of the up-user link signals and indicating whether the user link signal is duplicated, generates a duplicated signal, and outputs the duplicated signal and the up-user-link signal to the multiplexing units corresponding to second beams respectively allocated to the duplicated signal and the up-user-link signal.

13 Claims, 12 Drawing Sheets

(51) Int. Cl.
  *H04B 7/08* (2006.01)
  *H04B 7/204* (2006.01)
(52) U.S. Cl.
  CPC ....... *H04B 7/2041* (2013.01); *H04B 7/18515* (2013.01)
(58) Field of Classification Search
  CPC ............ H04B 7/18508; H04B 7/18523; H04B 7/18576; H04B 7/18582; H04B 7/18584; H04B 7/2041; H04B 7/2606; H04W 84/047; H04W 88/04; H04W 16/26
  See application file for complete search history.

(56) References Cited

OTHER PUBLICATIONS

Fujimura et al, Novel DEMUX/MUX Method for Flexible Digital Channelizers using Half Band Filters, International Communications Satellite Systems Conferences (ICSSC), 10 pages, Oct. 2013.*
Ejima et al, Digital Channelizer for High Throughput Satellite Communications, Mitsubishi Electric Advance, 4 pages, Sep. 2014.*
Tani et al, An Adaptive Beam Control Technique for Diversity Gain Maximization in LEO Satellite to Ground Transmissions, IEEE, 5 pages, 2016.*
Gharanjik et al. "Multiple Gateway Transmit Diversity in Q/V Band Feeder Links." IEEE Transactions on Communications. vol. 63, No. 3. Mar. 2015. pp. 916-926.
Extended European Search Report dated Oct. 26, 2018 issued in the corresponding European Application No. 15911392.7.

* cited by examiner

| GROUND TERMINAL STATION | PRESENCE OR ABSENCE OF DUPLICATION | FEEDER BEAM | FREQUENCY BAND |
|---|---|---|---|
| 2-1 | ABSENT | 7-1 | $F_1$ |
| 2-2 | PRESENT | 7-1 | $F_2$ |
|  |  | 7-2 | $F_1$ |
| 2-3 | ABSENT | 7-2 | $F_2$ |
| 2-4 | PRESENT | 7-2 | $F_2$ |
|  |  | 7-3 | $F_2$ |

COMMUNICATION SATELLITE, LINE CONTROL DEVICE, AND SATELLITE COMMUNICATION SYSTEM

FIELD

The present invention relates to a communication satellite that relays communication between a ground terminal and a ground base station, a line control device, and a satellite communication system.

BACKGROUND

In a satellite communication system, as a method of reducing unavailability of a down feeder link due to the influence of a rainfall or the like, there are technologies disclosed in Non Patent Literature 1, Patent Literature 1, and the like. A feeder link is a line between a communication satellite and a ground base station. The down feeder link is a line in a direction of transmission from the communication satellite to the ground base station.

Non Patent Literature 1 discloses a satellite communication system including an auxiliary ground base station and using selective transmission diversity for switching a ground base station, to which a communication satellite is connected, according to a state of a propagation path to thereby reduce unavailability of a down feeder link. Patent Literature 1 discloses a technology for realizing site diversity without using a leased line. The site diversity is a technology in which a communication satellite transmits the same signal to a plurality of ground base stations to thereby reduce unavailability of a down feeder link.

CITATION LIST

Patent Literature

Patent Literature 1: Japanese Patent Application Laid-Open No. S63-179629

Non Patent Literature

Gharanjik et al., "Multiple Gateway Transmit Diversity in Q/V Band Feeder Links," IEEE TRANSACTIONS ON COMMUNICATIONS, VOL. 63, NO. 3, MARCH 2015

SUMMARY

Technical Problem

A communication satellite functions as a relay device that relays communication data, which is transmitted from a ground terminal, to a ground base station. In the satellite communication system that performs the selective transmission diversity disclosed in Non Patent Literature 1, relay destinations of communication data to be transmitted are collectively switched to other ground base stations in a unit of ground base stations. When requested quality for an up user link, which is a line between a ground terminal and a communication satellite in a direction from the ground terminal to the communication satellite, that is, requested propagation path quality is different among ground base stations, the ground base station is switched on the basis of the highest requested quality. Therefore, unnecessary switching frequently occurs for ground terminals having low requested quality, that is, ground terminals having the requested quality lower than the highest requested quality. Communication is temporality interrupted when the switching is performed. Therefore, there is a problem in that efficiency of communication is deteriorated in the ground terminals having the low requested quality.

In the satellite communication system that performs the site diversity disclosed in Patent Literature 1, the same signal is transmitted to a plurality of ground base stations. Therefore, when there is a difference in requested quality of ground terminals with respect to an up user link, signals are relayed to the ground base stations even if the ground base stations are terminals having low requested quality for which transmission by the site diversity is unnecessary. Therefore, there is a problem in that frequency use efficiency is deteriorated.

The present invention has been devised in view of the above, and an object of the present invention is to obtain a communication satellite that can reduce unavailability of a down feeder link while suppressing deterioration in communication efficiency and deterioration in frequency use efficiency.

Solution to Problem

To solve the problems and achieve the object, a communication satellite according to the present invention includes: a plurality of first antennas capable of respectively forming different first beams; and a plurality of second antennas capable of respectively forming different second beams for transmitting signals to a ground base station. The communication satellite according to the present invention includes, for each of the first antennas, a demultiplexing unit to divide a reception signal received by the first beam into user link signals, which are signals for each of ground terminals at transmission sources, includes, for each of the second antennas, a multiplexing unit to multiplex input signals and output the signals to the second antenna. The communication satellite according to the present invention includes a switch to duplicate, on the basis of information determined for each of the user link signals and indicating whether the user link signal is duplicated, a user signal for which duplication is instructed by the information, generate a duplicated signal, and output the duplicated signal and the user link signal to the multiplexing units corresponding to second beams respectively allocated to the duplicated signal and the user link signal.

Advantageous Effects of Invention

According to the present invention, there is an effect that it is possible to reduce unavailability of a down feeder link while suppressing deterioration in communication efficiency and deterioration in frequency use efficiency.

DESCRIPTION OF EMBODIMENTS

Communication satellites, line control devices, and satellite communication systems according to embodiments of the present invention are explained in detail below with reference to the drawings. Note that the present invention is not limited by the embodiments.

First Embodiment

Figure 1:
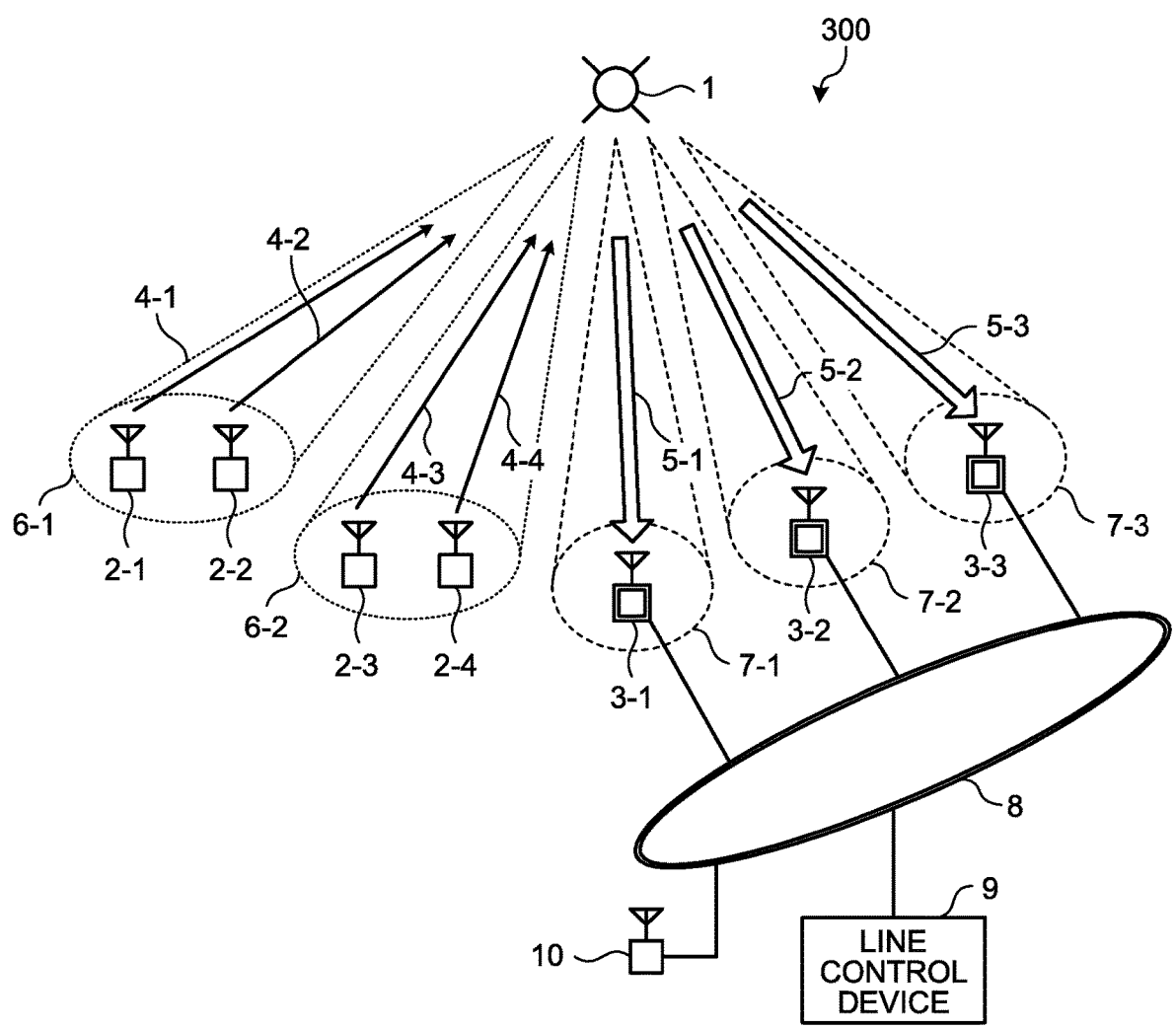
FIG. 1 is a diagram illustrating a configuration example of a satellite communication system according to a first embodiment.

FIG. 1 is a diagram illustrating a configuration example of a satellite communication system according to a first embodiment of the present invention. As illustrated in FIG. 1, a satellite communication system 300 in this embodiment is configured by a communication satellite 1, ground terminals 2-1 to 2-4, ground base stations 3-1 to 3-3, a line control device 9, and a control station 10. The communication satellite 1 is capable of forming user beams 6-1 and 6-2 and feeder beams 7-1 to 7-3. The user beams 6-1 and 6-2 are beams formed for communication between the communication satellite 1 and the ground terminals 2-1 to 2-4, which are user terminals. The feeder beams 7-1 to 7-3 are beams formed for communication between the communication satellite 1 and the ground base stations 3-1 to 3-3.

Note that, in FIG. 1, two user beams and three feeder beams are illustrated. However, the numbers of user beams and feeder beams are respectively not limited to the example illustrated in FIG. 1 and can be any number. The number of ground base stations and the number of ground terminals respectively present in zones of the user beams 6-1 and 6-2 are not limited to the example illustrated in FIG. 1.

As illustrated in FIG. 1, the ground terminal 2-1 and the ground terminal 2-2 are present in the zone of the user beam 6-1. The ground terminal 2-3 and the ground terminal 2-4 are present in the zone of the user beam 6-2. The ground base stations 3-1, 3-2, and 3-3 are respectively present in zones of the feeder beams 7-1, 7-2, and 7-3. The communication satellite 1 functions as a relay device that relays communication data, which are transmitted from the ground terminals 2-1 to 2-4, to the ground base stations 3-1 to 3-3. Note that, in this embodiment, communication in a direction which the communication satellite 1 relays communication data, which are transmitted from the ground terminals 2-1 to 2-4, to the ground base stations 3-1 to 3-3 is explained. However, the communication satellite 1 can further relay communication data, which are transmitted from the ground base stations 3-1 to 3-3, to the ground terminals 2-1 to 2-4. A configuration and operation for the communication satellite 1 to relay the communication data, which are transmitted from the ground base stations 3-1 to 3-3 to the ground terminals 2-1 to 2-4, can be a general configuration and general operation and can be any configuration and any operation. Therefore, detailed explanation of the configuration and the operation is omitted.

The ground terminal 2-1 and the ground terminal 2-2 respectively transmit communication data to the communication satellite 1 with up user links. Up-user-link signals 4-1 and 4-2 indicate signals respectively transmitted from the ground terminals 2-1 and 2-2 to the communication satellite 1 by user links. Down-feeder-link signals 5-1, 5-2, and 5-3 indicate signals respectively transmitted from the communication satellite 1 to the ground base stations 3-1, 3-2, and 3-3 by down feeder links. The communication satellite 1 receives the up-user-link signals 4-1 and 4-2 with a user beam 6-1, in a zone of which the ground terminals 2-1 and 2-2 respectively corresponding to the up-user-link signals 4-1 and 4-2 are present, and receives up-user-link signals 4-3 and 4-4 with a user beam 6-2, in a zone of which the ground terminals 2-3 and 2-4 respectively corresponding to the up-user-link signals 4-3 and 4-4 are present. The communication satellite 1 includes the up-user-link signals 4-1 to 4-4 respectively in one or more of the down-feeder-link signals 5-1, 5-2, and 5-3 and transmits the up-user-link signals 4-1 to 4-4.

The ground base stations 3-1 to 3-3 and the line control device 9 are mutually connected via a ground network 8. The ground base stations 3-1 to 3-3 and the line control device 9 can also be connected to a communication device not illustrated in FIG. 1, which is connected to the ground network 8, directly or indirectly via another device and another ground network.

The line control device 9 is connected to the control station 10. The line control device 9 creates a control command, which is a command for controlling the communication satellite 1, and transmits the control command to the control station 10. That is, the line control device 9 generates a control command including control information transmitted to the communication satellite 1. Note that the line control device 9 and the control station 10 can be collectively called control station as well. The control station 10 is set on the ground and includes a transmitter that transmits the control command to the communication satellite 1, and a receiver that receives data called telemetry from the communication satellite 1. The telemetry is data decided in advance to grasp, on the ground, a state of the communication satellite 1 or data designated by the control command. In this embodiment, the telemetry includes reception power of reception signals received by user beams, transmission power of a transmission signal transmitted by a feeder beam, and reception power of narrowband signals after demultiplexing explained below in the communication satellite 1. For communication between the control station 10 and the communication satellite 1, a control line not illustrated in FIG. 1 is used. The control station 10 transmits the control command received from the line control device 9 to the communication satellite 1.

In FIG. 1, two user beams are illustrated. However, there is also a satellite communication system that uses a large number of user beams as many as one hundred. The configuration and the operation in this embodiment are also applicable to the satellite communication system that uses a large number of user beams in this way. In the satellite communication system that uses a large number of user beams, a method of repeatedly using a frequency is sometimes used to improve frequency use efficiency. In the method of repeatedly using a frequency, frequencies different from each other or polarized waves different from each other are permitted to be used between user beams adjacent to each other. The same frequency and the same polarized wave are permitted to be used between user beams separated by a fixed distance or more.

In the example illustrated in FIG. 1, an example is illustrated in which the user beams 6-1 and 6-2 are adjacent to each other. At least one of frequencies and polarized waves are differentiated to avoid or reduce interference of the user beams 6-1 and 6-2. In the following explanation, an example is explained in which different frequencies are used in the user beams 6-1 and 6-2. Note that, as explained above, different polarized waves having the same frequency can be used in the user beams 6-1 and 6-2. On the other hand, in the example illustrated in FIG. 1, it is assumed that the feeder beams 7-1 to 7-3 are separated from one another by a fixed distance or more, interference of the feeder beams 7-1 to 7-3 does not have to be taken into account, and the same frequency and the same polarized wave can be allocated to each of the feeder beams 7-1 to 7-3. Note that, a satellite communication system that uses three or more user beams only has to include, by the number of user beams, components included in the communication satellite 1 for each of the user beams.

Figure 2:
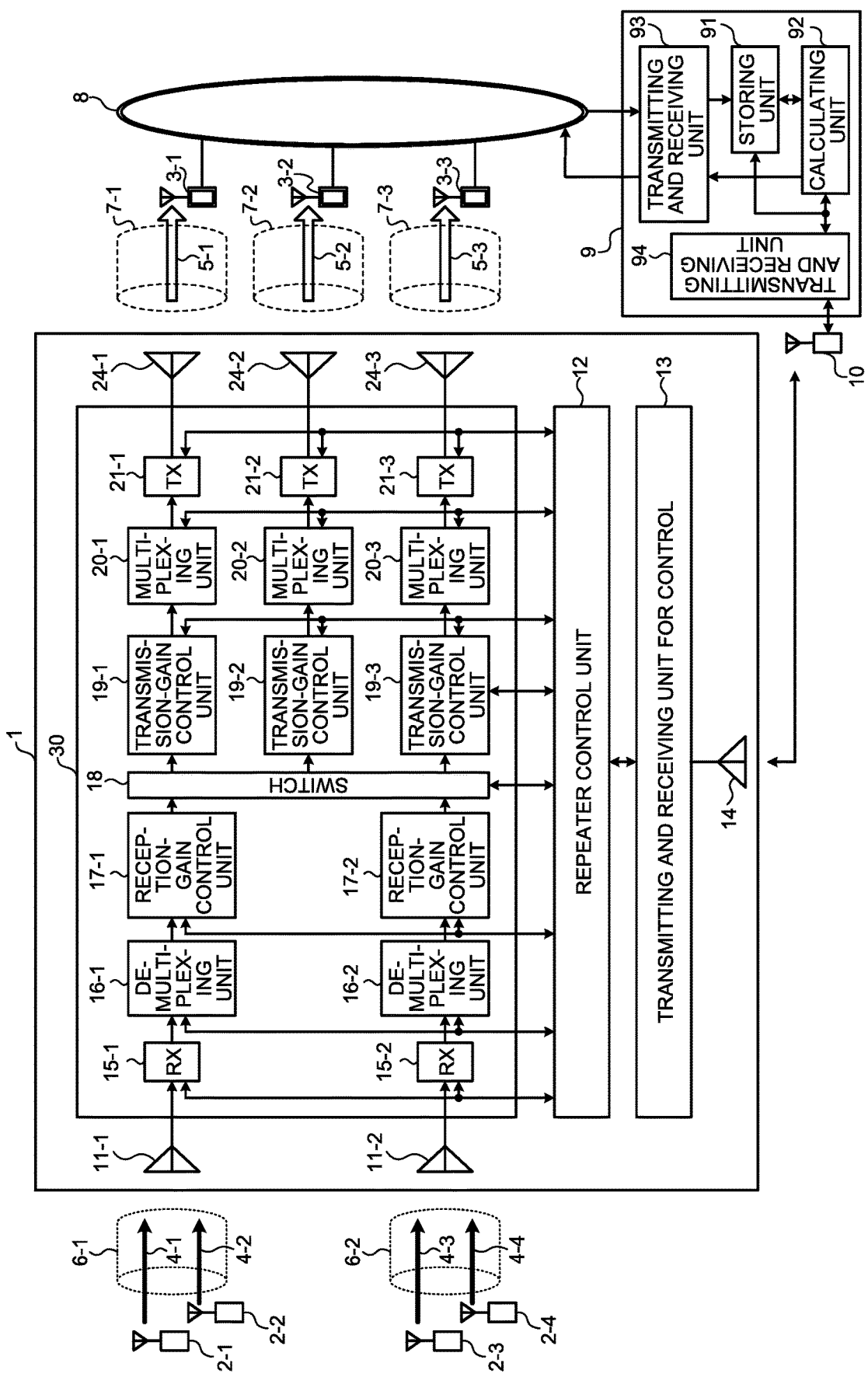
FIG. 2 is a diagram illustrating a configuration example of a communication satellite 1 and a line control device in the first embodiment.

FIG. 2 is a diagram illustrating a configuration example of the communication satellite 1 and the line control device 9 in the first embodiment. As illustrated in FIG. 2, the communication satellite 1 in this embodiment includes user beam antennas 11-1 and 11-2, an antenna 14, feeder beam antennas 24-1 to 24-3, a repeater control unit 12, a transmitting and receiving unit for control 13, and a repeater 30. The user beam antennas 11-1 and 11-2, which are a plurality of first antennas, are antennas capable of forming the user beams 6-1 and 6-2, which are first beams different from each other. The feeder beam antennas 24-1, 24-2, and 24-3, which are a plurality of second antennas, are antennas capable of forming the feeder beams 7-1, 7-2, and 7-3, which are respectively different second beams for transmitting signals to the ground base stations 3-1 to 3-3.

As illustrated in FIG. 2, the repeater 30 includes reception radio frequency (RF) units (in the figure, abbreviated as RXs) 15-1 and 15-2, demultiplexing units 16-1 and 16-2, reception-gain control units 17-1 and 17-2, a switch 18, transmission-gain control units 19-1 to 19-3, multiplexing units 20-1 to 20-3, and transmission RF units (in the figure, abbreviated as TXs) 21-1 to 21-3. As illustrated in FIG. 2, the communication satellite 1 includes, by the number of feeder beams, reception RF units, demultiplexing units, and the reception-gain control units and includes, by the number of feeder beams, transmission-gain control units, multiplexing units, and transmission RF units.

The reception RF unit 15-1 applies analog signal processing such as amplification, filter processing, and frequency conversion to a reception signal received by the user beam antenna 11-1 and outputs the reception signal after the processing to the demultiplexing unit 16-1.

The demultiplexing unit 16-1 fragments the reception signal input from the reception RF unit 15-1 into narrowband signals, which are signals having a bandwidth narrower than the bandwidth of the input reception signal, and outputs the narrowband signals to the switch 18 via the reception-gain control unit 17-1. The narrowband signals are signals having a band corresponding to an up-user-link signal or a band narrower than the band corresponding to the up-user-link signal. One or more narrowband signals correspond to one up-user-link signal. That is, the demultiplexing unit 16-1 divides a reception signal received by the user beam 6-1 into up-user-link signals, which are user signals for each of ground terminals at transmission sources, and outputs the up-user-link signals to the reception-gain control unit 17-1. Details of demultiplexing in the demultiplexing unit 16-1 are explained below.

The reception-gain control unit 17-1 adjusts at least one of amplitudes and phases respectively for the narrowband signals output from the demultiplexing unit 16-1 and outputs the narrowband signals after the adjustment to the switch 18. Note that the communication satellite 1 does not have to include the reception-gain control unit 17-1. The reception-gain control unit 17-1 can be included in the demultiplexing unit 16-1.

The reception RF unit 15-2, the demultiplexing unit 16-2, and the reception-gain control unit 17-2 carry out the same processing as the processing of the reception RF unit 15-1, the demultiplexing unit 16-1, and the reception-gain control unit 17-1 on a reception signal received by the user beam antenna 11-2. Consequently, narrowband signals, at least one of amplitudes and phases of which is adjusted, are input to the switch 18 from the reception-gain control unit 17-2.

The switch 18 carries out, according to switching rules instructed from the repeater control unit 12, replacement processing for a feeder beam at a connection destination and frequency arrangement on the input narrowband signals. The replacement processing for a feeder beam at a connection destination is processing for outputting the narrowband signals to the transmission-gain control units 19-1 to 19-3 corresponding to a feeder beam at a destination decided by switching rules for each of the narrowband signals. The replacement processing for frequency arrangement is processing for deciding arrangement of the narrowband signals in a signal transmitted by the same feeder beam. There is no limitation on a specific implementation method of the replacement processing for frequency arrangement. However, the replacement processing for frequency arrangement can be realized, for example, as explained below. It is assumed that the narrowband signals after the replacement processing are input from the switch 18 to the transmission-gain control units 19-1 to 19-3 respectively by a plurality of signal lines and output from the transmission-gain control units 19-1 to 19-3 to the multiplexing units 20-1 to 20-3 respectively by a plurality of signal lines. If numbers of the signal lines and the frequency arrangement are associated in advance, when the switch 18 outputs the narrowband signals to the transmission-gain control units 19-1 to 19-3, it is possible to designate, by selecting a signal line at an output destination, frequency arrangement of the narrowband signals at the time when the multiplexing units 20-1 to 20-3 carry out multiplexing. Note that the communication satellite 1 does not have to include the transmission-gain control units 19-1 to 19-3 and can include the transmission-gain control units 19-1 to 19-3 respectively in the multiplexing units 20-1 to 20-3 corresponding to the transmission-gain control units 19-1 to 19-3.

Further, in this embodiment, the switch 18 sometimes carries out duplication processing for duplicating at least a part of the narrowband signals according to the switching rules instructed from the repeater control unit 12 and outputting the narrowband signals after the duplication to one or more of the transmission-gain control units 19-1 to 19-3. That is, the switch 18 duplicates, on the basis of information determined for each of up-user-link signals and indicating whether the up-user-link signal is duplicated, the up-userlink signal for which duplication is instructed by the information, generates a duplicated signal, and outputs the duplicated signal and the up-user-link signal to the multiplexing units 20-1 to 20-3 corresponding to the feeder beams 7-1 to 7-3 respectively allocated to the duplicated signal and the up-user-link signal. Content of the switching rules in this embodiment is explained below. The duplication processing can be performed before the replacement processing or can be performed after the replacement processing. However, when the duplicated narrowband signals are distributed to two or more feeder beams, the narrowband signals are duplicated before the replacement processing.

The transmission-gain control unit 19-1 adjusts at least one of amplitudes and phases for the narrowband signals output from the switch 18 and outputs the narrowband signals after the adjustment to the multiplexing unit 20-1.

The multiplexing unit 20-1 combines, that is, multiplexes one or more narrowband signals output from the transmission-gain control unit 19-1 into a wideband signal using frequency conversion processing or the like and outputs the signal after the multiplexing to the transmission RF unit 21-1. That is, the multiplexing unit 20-1 multiplexes input signals and outputs the input signals to the feeder beam antenna 24-1 via the transmission RF unit 21-1.

The transmission RF unit 21-1 applies analog signal processing such as frequency conversion processing, filter processing, and amplification to the signal multiplexed by the multiplexing unit 20-1 and outputs the signal after the processing to the feeder beam antenna 24-1. The transmission-gain control unit 19-2, the multiplexing unit 20-2, and the transmission RF unit 21-2 carry out the same processing as the processing of the transmission-gain control unit 19-1, the multiplexing unit 20-1, and the transmission RF unit 21-1. The transmission RF unit 21-2 outputs the signal after the processing to the feeder beam antenna 24-2. The transmission-gain control unit 19-3, the multiplexing unit 20-3, and the transmission RF unit 21-3 carry out the same processing as the processing of the transmission-gain control unit 19-1, the multiplexing unit 20-1, and the transmission RF unit 21-1. The transmission RF unit 21-3 outputs the signal after the processing to the feeder beam antenna 24-3.

The transmitting and receiving unit for control 13 is a transceiver that receives a control command transmitted from the control station 10 and transmits telemetry to the control station 10. The transmitting and receiving unit for control 13 outputs relay control information, which is information included in a control command concerning relay operation in the control command received from the control station 10, to the repeater control unit 12. The repeater control unit 12 controls the repeater 30 on the basis of the relay control information. The relay control information includes, for example, replacement rules in the switch 18 of the repeater 30 and gains in the reception-gain control units 17-1 and 17-2 and the transmission-gain control units 19-1 to 19-3, that is, information for adjusting at least one of amplitudes and phases. Note that the gains indicate complex gains. The gains indicate at least one of adjustment amounts of the amplitudes and adjustment amounts of the phases. The repeater 30 outputs, on the basis of an instruction from the repeater control unit 12, communication data received by the user beam antennas 11-1 and 11-2 to the feeder beam antennas 24-1 to 24-3.

As illustrated in FIG. 2, the line control device 9 in this embodiment includes a storing unit 91, a calculating unit 92, and transmitting and receiving units 93 and 94. The calculating unit 92 carries out processing for generating a control command. Processing for generating a control command includes calculation processing for switching rules in this embodiment as explained below. The transmitting and receiving unit 93 is a transceiver that carries out communication between the line control device 9 and the ground network 8. The transmitting and receiving unit 94 is a transceiver that carries out communication between the line control device 9 and the control station 10. The storing unit 91 stores various data used for processing of the calculating unit 92 and stores a program for realizing the processing of the calculating unit 92.

Figure 3:
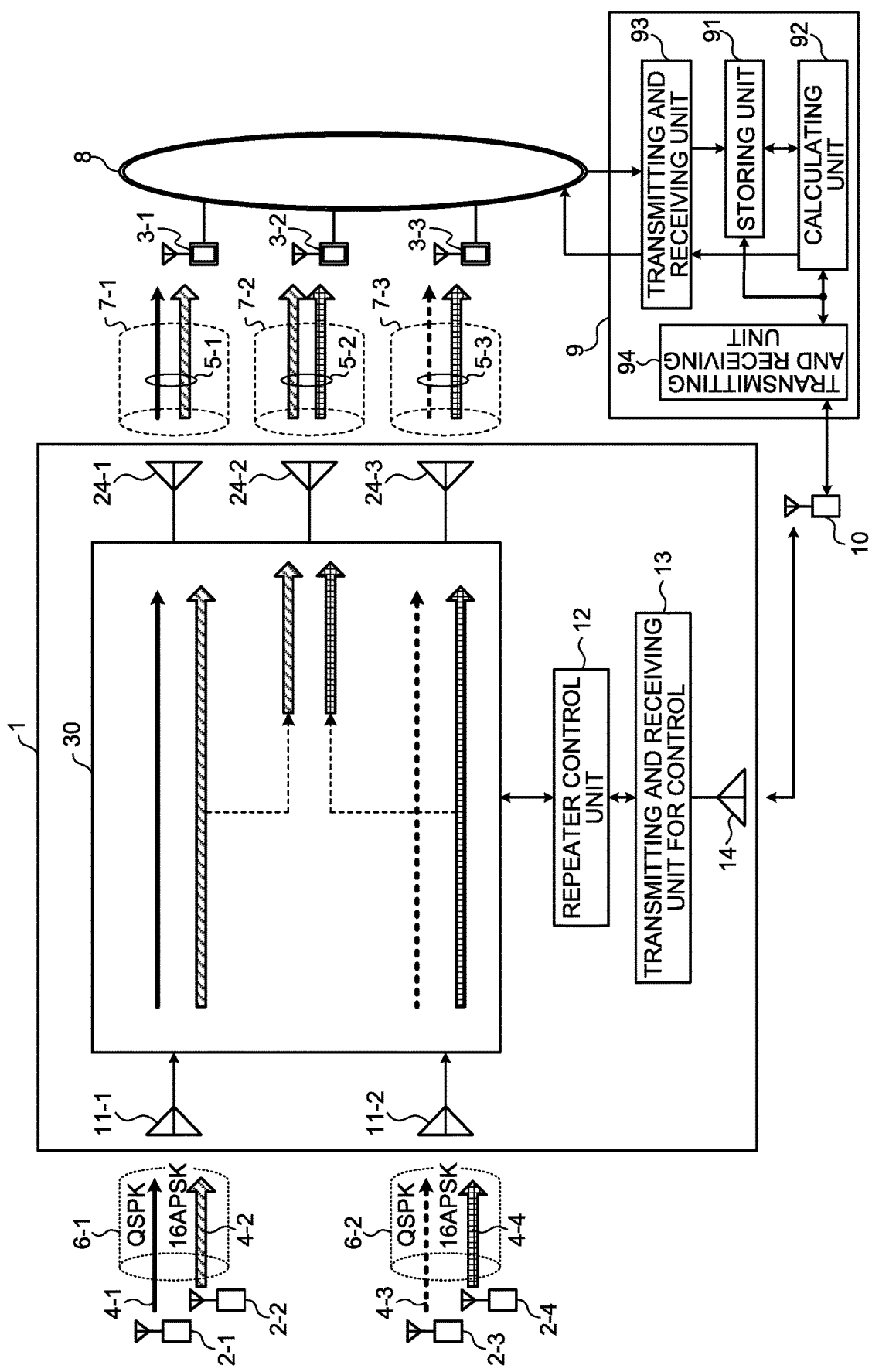
FIG. 3 is a diagram schematically illustrating a relay operation in the satellite communication system in the first embodiment.

Operation in this embodiment is explained. FIG. 3 is a diagram schematically illustrating relay operation in the satellite communication system in this embodiment. The communication satellite 1 receives, with the user beam 6-1, the up-user-link signals 4-1 and 4-2 respectively transmitted from the ground terminals 2-1 and 2-2 and receives, with the user beam 6-2, the up-user-link signals 4-3 and 4-4 respectively transmitted from the ground terminals 2-3 and 2-4. In an example illustrated in FIG. 3, the up-user-link signals 4-1 and 4-3 are signals modulated by Quadrature Phase Shift Keying (QPSK). The up-user-link signals 4-2 and 4-4 are signals modulated by 16 Amplitude Phase Shift Keying (APSK).

In general, as a multivalue number of a modulation scheme is larger, a requested Carrier to Noise ratio (C/N) for satisfying requested communication quality is higher. Therefore, a requested C/N for the up-user-link signals 4-2 and 4-4 is higher than a requested C/N for the up-user-link signals 4-1 and 4-3. In general selective transmission diversity and site diversity, when a transmission line state is deteriorated by rainfall attenuation or the like, switching of a transfer destination of an up-user-link signal or duplication of the up-user-link signal is performed in a unit of ground base stations. When compared to the configuration example illustrated in FIG. 2, the switching or the duplication of the up-user-link signal is performed in a unit of signals input to the multiplexing units 20-1 to 20-3. When there is a difference in requested C/Ns among up-user-link signals, in the general selective transmission diversity and site diversity, the switching or the duplication is performed according to an up-user-link signal having the highest requested C/N. That is, unnecessary switching or duplication is performed for up-user-link signals having low requested C/Ns, which are up-user-link signals other than the up-user-link signal having the highest requested C/N. Therefore, deterioration in communication efficiency or deterioration in frequency use efficiency occurs.

On the other hand, in this embodiment, according to requested C/Ns for up-user-link signals, that is, communication quality requested for the up-user-link signals, it is determined whether the up-user-link signals are duplicated.

In the example illustrated in FIG. 3, the repeater 30 of the communication satellite 1 duplicates the up-user-link signals 4-2 and 4-4 having high requested C/Ns and transmits the up-user-link signals 4-2 and 4-4 with a plurality of feeder link beams. Specifically, the repeater 30 duplicates the up-user-link signal 4-2 and transmits the up-user-link signal 4-2 with the feeder beam 7-1 and the feeder beam 7-2. The repeater 30 duplicates the up-user-link signal 4-4 and transmits the up-user-link signal 4-4 with the feeder beams 7-2 and 7-3. That is, an up-user-link signal and a duplicated signal of the up-user-link signal are allocated to different feeder beams. Consequently, the up-user-link signal 4-2 is received by the ground base station 3-1 and received by the ground base station 3-2. The up-user-link signal 4-4 is received by the ground base station 3-2 and received by the ground base station 3-3. In this way, it is possible to realize site diversity for the up-user-link signals 4-2 and 4-4 having the high requested C/Ns. It is possible to improve unavailability of feeder links.

On the other hand, in the example illustrated in FIG. 3, the repeater 30 of the communication satellite 1 does not duplicate the up-user-link signals 4-1 and 4-3 having the low requested C/Ns and transmits each of the up-user-link signals 4-1 and 4-3 with one feeder link beam. In the general selective transmission diversity and site diversity, the switching or the duplication is performed for the up-user-link signals 4-1 and 4-3 as well. However, in this embodiment, the switching or the duplication is not performed for the up-user-link signals 4-1 and 4-3. In this embodiment, an up-user-link signal having a high requested C/N is duplicated and transmitted by a plurality of feeder link beams. An up-user-link signal having a low requested C/N is not duplicated. Consequently, it is possible to suppress deterioration in communication efficiency and deterioration in frequency use efficiency while realizing the site diversity.

Figure 4:
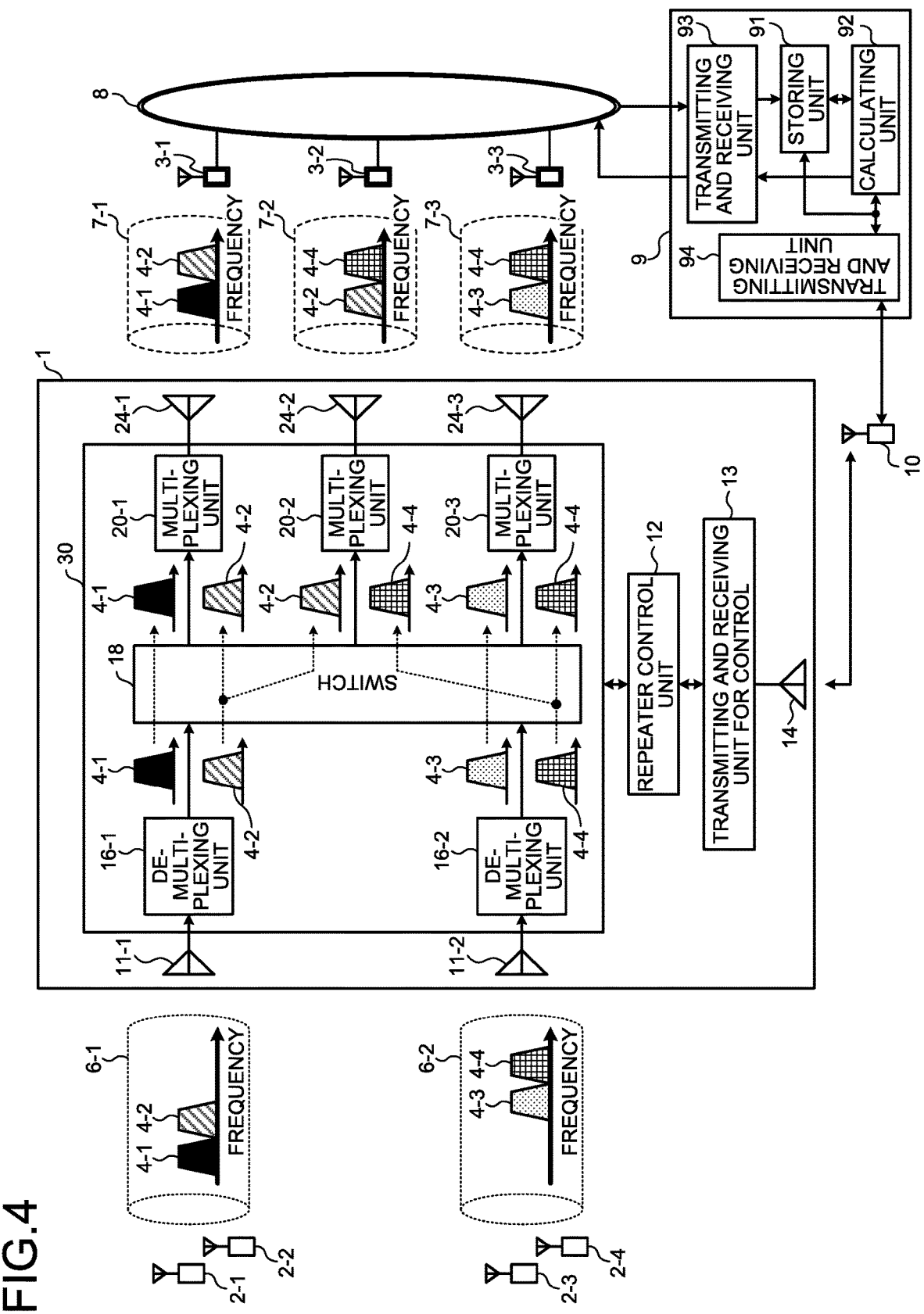
FIG. 4 is a diagram for explaining, in detail, the operation illustrated in FIG. 3.

FIG. 4 is a diagram for explaining the operation illustrated in FIG. 3 in detail. The operation in the communication satellite 1 is explained in detail with reference to FIG. 4. Note that, in FIG. 4, a part of components in the repeater 30 is omitted to facilitate explanation of operation. However, actually, the configuration in the repeater 30 is the configuration illustrated in FIG. 2.

As illustrated in FIG. 4, the up-user-link signals 4-1 and 4-2 are frequency-multiplexed with a reception signal received by the user beam antenna 11-1. The up-user-link signals 4-3 and 4-4 are frequency-multiplexed with a reception signal received by the user beam antenna 11-2. As explained above, it is premised that the user beams 6-1 and 6-2 use adjacent and different frequencies. Therefore, the frequency of the reception signal received by the user beam antenna 11-1 and the frequency of the reception signal received by the user beam antenna 11-2 are arranged not to overlap. When polarized waves are orthogonal between the reception signal received by the user beam antenna 11-1 and the reception signal received by the user beam antenna 11-2, for example, when one of the polarized wave is a right circularly polarized wave and the other is a left circularly polarized wave, the frequency of the reception signal received by the user beam antenna 11-1 and the frequency of the reception signal received by the user beam antenna 11-2 can overlap. When the user beams 6-1 and 6-2 are separated to a degree in which the influence of interference can be neglected, the frequency of the reception signal received by the user beam antenna 11-1 and the frequency of the reception signal received by the user beam antenna 11-2 can overlap. As an allocation method for frequencies and polarized waves, any allocation method can be used as long as reception signals received by user beams on the communication satellite 1 side can be separated.

In the repeater 30, the demultiplexing units 16-1 and 16-2 fragment reception signals respectively received by the user beam antennas 11-1 and 11-2 via the reception RF units 15-1 and 15-2 and generate narrowband signals. The demultiplexing units 16-1 and 16-2 are filter banks configured by pluralities of narrowband filters. The demultiplexing units 16-1 and 16-2 extract, from input signals, signals in frequency bands set by the repeater control unit 12 to thereby generate narrowband signals. In an example illustrated in FIG. 4, the demultiplexing unit 16-1 extracts, from a reception signal received by the user beam antenna 11-1, signals in frequency bands respectively corresponding to the up-user-link signal 4-1 and the up-user-link signal 4-2 to thereby generate two narrowband signals. The demultiplexing unit 16-2 extracts, from a reception signal received by the user beam antenna 11-2, signals in frequency bands respectively corresponding to the up-user-link signal 4-3 and the up-user-link signal 4-4 to thereby generate two narrowband signals.

In the example illustrated in FIG. 4, an example is illustrated in which the up-user-link signal 4-1 and the up-user-link signal 4-2 have the same frequency bandwidth and a frequency bandwidth of a narrowband signal output from the demultiplexing unit 16-1 is the same as frequency bandwidths of the up-user-link signal 4-1 and the up-user-link signal 4-2. However, bandwidths, that is, frequency bandwidth of signals are not limited to the example illustrated in FIG. 4. For example, the frequency bandwidths can be different in the up-user-link signal 4-1 and the up-user-link signal 4-2. The demultiplexing unit 16-1 can generate narrowband signals having bandwidths narrower than the bandwidth of the up-user-link signals. In this case, one up-user-link signal is decomposed into a plurality of narrowband signals. Even if one up-user-link signal is decomposed in this way, if the narrowband signals obtained by decomposing one up-user-link signal are input to the same multiplexing units 20-1 to 20-3 and the multiplexing units 20-1 to 20-3 configure the decomposed narrowband signals, the original up-user-link signals are restored. The repeater including the demultiplexing units, the switch, and the multiplexing units is generally known as a channelizer. There are various methods of realizing the channelizer; for example, a channelizer configured by only an analog element, a channelizer configured by digital signal processing, and a channelizer having a hybrid configuration of the analog element and the digital signal processing. In the satellite communication system according to the first embodiment, a method of configuring the channelizer can be any method as long as the channelizer is capable of extracting a specific up-user-link signal and capable of duplicating signal components.

The narrowband signals generated by the demultiplexing units 16-1 and 16-2 are input to the switch 18. The switch 18 distributes the input narrowband signals to the multiplexing units 20-1 to 20-3 according to switching rules instructed from the repeater control unit 12. As explained above, the switching rules are transmitted from the control station 10 determined by the line control device 9 and is input to the repeater control unit 12 via the antenna 14 and the transmitting and receiving unit for control 13 of the communication satellite 1. The switching rules include rules concerning duplication of narrowband signals as well. In the examples illustrated in FIG. 3 and FIG. 4, the switching rules specifies that the up-user-link signals 4-1 and 4-2 are transmitted from the feeder beam 7-1 and the up-user-link signals 4-3 and 4-4 are transmitted from the feeder beam 7-3 and specifies that the up-user-link signals 4-2 and 4-4 are duplicated and transmitted from the feeder beam 7-2.

The switch 18 duplicates the up-user-link signal 4-2 and outputs the up-user-link signal 4-2 to the multiplexing unit 20-1 corresponding to the feeder beam 7-1 and the multiplexing unit 20-2 corresponding to the feeder beam 7-2. The switch 18 duplicates the up-user-link signal 4-4 and outputs the up-user-link signal 4-4 to the multiplexing unit 20-2 corresponding to the feeder beam 7-2 and the multiplexing unit 20-3 corresponding to the feeder beam 7-3. The switch 18 outputs the up-user-link signal 4-1 to the multiplexing unit 20-1 corresponding to the feeder beam 7-1 and outputs the up-user-link signal 4-3 to the multiplexing unit 20-3 corresponding to the feeder beam 7-3. The multiplexing units 20-1 to 20-3 respectively multiplex the input narrowband signals and output the narrowband signals to the feeder beam antennas 24-1 to 24-3 corresponding to the multiplexing units 20-1 to 20-3 via the transmission RF units 21-1 to 21-3 corresponding to the multiplexing units 20-1 to 20-3. Arrangement on frequencies of the narrowband signals in the multiplexing in the multiplexing units 20-1 to 20-3 is decided by switching rules. The feeder beam antennas 24-1 to 24-3 respectively transmit the input signals as the down-feeder-link signals 5-1 to 5-3 with the feeder beams 7-1 to 7-3.

In the examples explained with reference to FIG. 3 and FIG. 4, it is assumed that a rainfall occurs in an area corresponding to the feeder beam 7-1, rainfall attenuation occurs in the down-feeder-link signal 5-1, and a rainfall does not occur in an area corresponding to the feeder beam 7-2. In this case, because the up-user-link signal 4-2 having a high requested C/N is transmitted by both of the feeder beam 7-1 and the feeder beam 7-2, the up-user-link signal 4-2 is received by the ground base station 3-1 and the ground base station 3-2. Therefore, by extracting the up-user-link signal 4-2 from a signal received by the ground base station 3-2 without rainfall attenuation, it is possible to receive the up-user-link signal 4-2 without being affected by rainfall attenuation. Therefore, each of the ground base station 3-1 and the ground base station 3-2 demodulates the up-user-link signal 4-2 and, when there is an error in a demodulation result, acquires a demodulation result from the other ground base station. That is, a first ground base station, which is a ground base station that receives, from the communication satellite 1, a signal including the up-user-link signal 4-2 or a duplicated signal of the up-user-link signal 4-2, of the ground base station 3-1 and the ground base station 3-2 demodulates the signal received from the communication satellite 1. When determining that an error is included in a first demodulation result, which is a demodulation result, the first ground base station acquires, from a second ground base station, which is a ground base station that is the other of the ground base stations 3-1 and 3-2 that receives, from the communication satellite, the up-user-link signal 4-2 same as the up-user-link signal 4-2 received from the communication satellite 1, that is, not the first ground base station, a second demodulation result, which is a result obtained by demodulating the up-user-link signal 4-2 received from the communication satellite in the second ground base station. Note that the up-user-link signal 4-2 and the duplicated signal of the up-user-link signal 4-2 are the same up-user-link signal. Each of the ground base stations 3-1 and 3-2 selects a demodulation result without an error of the demodulation result acquired by the ground base station and the demodulation result acquired from the other ground base station. Consequently, an error of communication due to rainfall attenuation is avoided. If it is possible to transmit and receive reception signals between the ground base station 3-1 and the ground base station 3-2, it is also possible to perform diversity combination of the reception signal before the demodulation in the ground base station 3-1 and the reception signal before the demodulation in the ground base station 3-2. That is, the first ground base station, which receives a first signal, which is the up-user-link signal 4-2 or the duplicated signal of the up-user-link signal 4-2, from the communication satellite 1, can acquire a second signal, which is the signal received in the second ground base station, from the second ground base station and combine and demodulate the first signal and the second signal.

Figure 5:
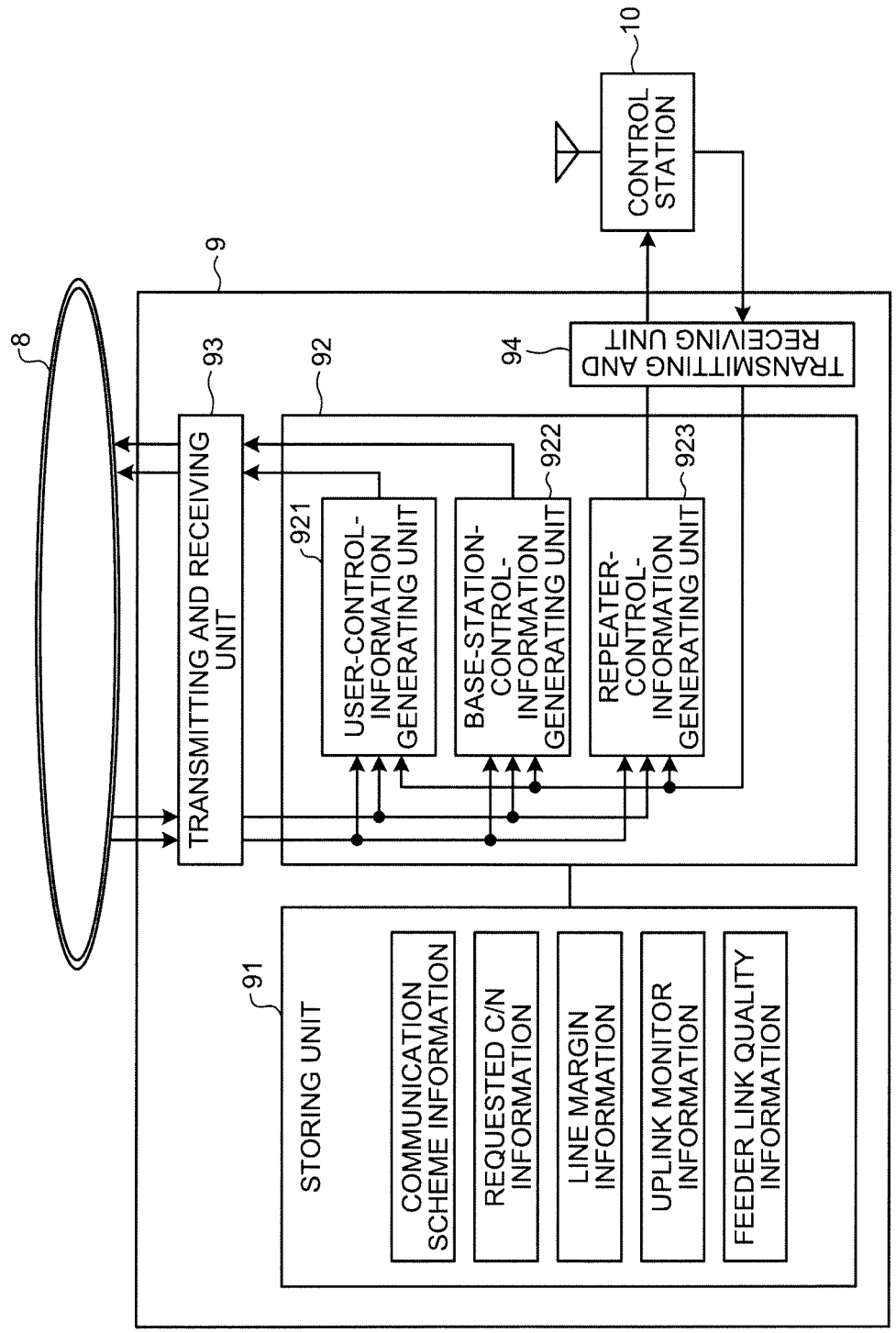
FIG. 5 is a diagram illustrating a detailed configuration example of the line control device in the first embodiment.

A generation method for switching rules in the line control device 9 in this embodiment is explained. As explained above, the switching rules in this embodiment are generated by the line control device 9. FIG. 5 is a diagram illustrating a detailed configuration example of the line control device 9 in this embodiment. As illustrated in FIG. 5, the calculating unit 92 includes a user-control-information generating unit 921, a base-station-control-information generating unit 922, and a repeater-control-information generating unit 923.

The user-control-information generating unit 921 generates control information for controlling the ground terminals 2-1 to 2-4 and transmits the control information to the ground terminals 2-1 to 2-2 via the transmitting and receiving unit 93, the ground network 8, the ground base stations 3-1 to 3-3, and the communication satellite 1. Note that, in FIG. 5, a configuration example of the line control device 9 in the case in which the communication satellite 1 has a function of relaying communication in a direction from the ground terminals 2-1 and 2-2 to the ground base stations 3-1 to 3-3, although not illustrated in FIG. 1, is illustrated. When the communication satellite 1 does not relay the communication in the direction from the ground terminals 2-1 to 2-2 to the ground base stations 3-1 to 3-3, the line control device 9 does not have to include the user-control-information generating unit 921.

The base-station-control-information generating unit 922 generates control information for controlling the ground base stations 3-1 to 3-3 and transmits the control information to the ground base stations 3-1 to 3-3 through the transmitting and receiving unit 93 and the ground network 8. The control information for controlling the ground base stations 3-1 to 3-3 includes information concerning which up-user-link signals the ground base stations 3-1 to 3-3 receive in which frequency bands, that is, signals transmitted from which ground terminals the ground base stations 3-1 to 3-3 receive in which frequency bands. When the diversity combination is carried out, the control information also includes information indicating which ground base stations carry out the diversity combination with which ground base stations.

The repeater-control-information generating unit 923 generates, as a control command, relay control information for controlling the repeater 30 of the communication satellite 1 and transmits the control command to the communication satellite 1 through the transmitting and receiving unit 94 and the control station 10. In the storing unit 91, communication scheme information, requested C/N information, line margin information, up-link monitor information, and feeder-link quality information are stored.

The communication scheme information is information indicating a form of a transmission signal in each of the ground terminals. The communication scheme is a modulation scheme, transmission speed, an error correction encoding ratio, and the like of the ground terminals 2-1 to 2-4. The communication scheme also includes a frequency band used by the ground terminal. When the user-control-information generating unit 921 of the line control device 9 indicates the communication scheme to the ground terminal using control information, communication schemes of the ground terminals 2-1 to 2-4 are stored in the storing unit 91. The line control device 9 can acquire the communication schemes of the ground terminals 2-1 to 2-4 from the ground terminals via the communication satellite 1. The communication schemes of the ground terminals 2-1 to 2-4 can be set in the line control device 9.

The requested C/N information is requested C/N for each of the ground terminals 2-1 to 2-4, that is, communication quality information requested to each of the ground terminals 2-1 to 2-4. For example, the requested C/N for each of the ground terminals 2-1 to 2-4 is calculated on the basis of the communication schemes of the ground terminals 2-1 to 2-4, that is, the communication scheme information. Alternatively, the line control device 9 can acquire the requested C/Ns from the ground terminals 2-1 to 2-4 through the communication satellite 1, the ground terminals 2-1 to 2-4, and the ground network 8. As a method of calculating a requested C/N from a communication scheme, any method can be used. For example, a method of deciding a requested C/N for each of modulation schemes using a table can be used. For example, a C/N corresponding to requested communication quality such as a requested bit error rate is calculated for each of modulation schemes by a prior simulation or the like. The C/N added with a line margin such as rainfall attenuation can be calculated as a requested C/N. When selecting a modulation scheme, it is possible to achieve improvement of use efficiency of a line by selecting, for example, a modulation scheme in which communication speed is the largest, from modulation scheme in which a line C/N is larger than a requested C/N.

The line margin information is information generated by processing in the repeater-control-information generating unit 923 explained below and is a calculation result of a line margin of each of the ground terminals.

The uplink monitor information indicates reception quality, that is, communication quality in the communication satellite 1 for each of the ground terminals, that is, for each of user beams. It is assumed that the communication satellite 1 uses, as the reception quality, reception power of reception signals received by the user beams. The reception power of the reception signals received by the user beams is measured by the reception RF units 15-1 to 15-2 of the communication satellite 1. The transmitting and receiving unit 94 of the line control device 9 receives the measured reception power through the repeater control unit 12, the transmitting and receiving unit for control 13, the antenna 14, and the control station 10 and stores the measured reception power in the storing unit 91.

The feeder link quality information is information indicating communication quality of feeder links, that is, feeder beams. Specifically, the feeder link quality information is information indicating a propagation loss state. Calculation information of the propagation loss state of the feeder links is explained below.

The repeater-control-information generating unit 923 of the line control device 9 determines, on the basis of the feeder link propagation loss information, the requested C/N information, and the like, to which feeder beams user link signals are allocated, that is, switching rules. That is, the repeater-control-information generating unit 923 is a control unit that determines, for each of up-user-link signals, whether the up-user-link signal is duplicated in the communication satellite 1 and determines a feeder beam allocated to the up-user-link signal and a duplicated signal, which is a signal obtained by duplicating the up-user-link signal. For example, the repeater-control-information generating unit 923 allocates a user link signal having the highest requested C/N to a feeder beam corresponding to a feeder link having the smallest propagation loss. After allocating up-user-link signals having small propagation losses to the feeder links in descending order of requested C/Ns, when a feeder link to which an up-user-link signal is not allocated, that is, an empty feeder link is present, the repeater-control-information generating unit 923 selects a user link signal in ascending order of line margins, which are differences between estimated C/Ns during communication and the requested C/Ns, duplicates the selected user link signal, and allocates the duplicated user link signal to the empty feeder link. The repeater-control-information generating unit 923 also determines, on the basis of frequency bands of the user link signals, frequency arrangement of up-user-link signals in down-feeder-link signals. The number of signals that can be arranged in the feeder beams depends on the quality, that is, propagation losses of the respective feeder beams and allowed transmission power. Therefore, the repeater-control-information generating unit 923 performs control to arrange a larger number of signals to feeder links having higher quality within a range of the allowed transmission power on the basis of these kinds of information.

Propagation loss states of the respective feeder links can be estimated by, for example a procedure explained below. The transmission RF units 21-1 to 21-3 of the communication satellite 1 measure transmission power of transmission signals transmitted by feeder beams. The line control device 9 receives the transmission power of each of the feeder beams through the repeater control unit 12, the transmitting and receiving unit for control 13, the antenna 14, and the control station 10 and stores the transmission power in the storing unit 91. The line control device 9 acquires reception power measured in the ground base stations 3-1 to 3-3 from the ground base stations 3-1 to 3-3. The repeater-control-information generating unit 923 can estimate propagation losses of the feeder beams by comparing the transmission power and the reception power. The repeater-control-information generating unit 923 stores the propagation losses of the feeder beams in the storing unit 91 as feeder link quality information.

Figure 6:
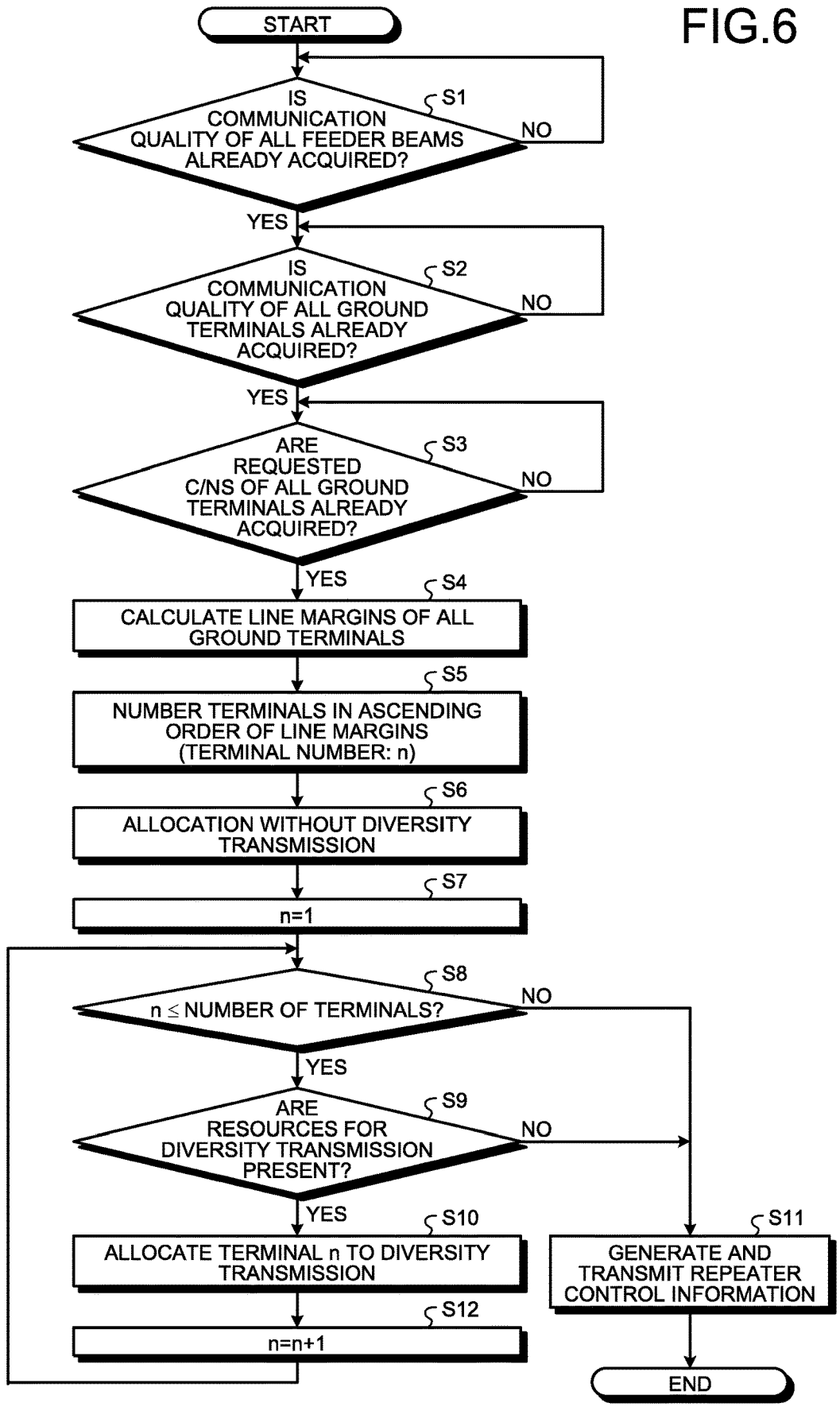
FIG. 6 is a flowchart illustrating an example of a generation procedure for switching rules in a repeater-control-information generating unit in the first embodiment.

FIG. 6 is a flowchart illustrating an example of a generation procedure for switching rules in the repeater-control-information generating unit 923. As illustrated in FIG. 6, first, the repeater-control-information generating unit 923 determines whether communication quality information of all feeder beams of the communication satellite 1 is already acquired (step S1). That is, the repeater-control-information generating unit 923 determines whether propagation loss information corresponding to all the feeder beams is stored in the storing unit 91 as feeder link quality information. When the communication quality information of all the feeder beams is not acquired yet (No at step S1), the repeater-control-information generating unit 923 repeats step S1. Note that, as explained above, separately from the flow of FIG. 6, the repeater-control-information generating unit 923 calculates propagation losses of the feeder beams in the procedure explained above and stores the propagation losses in the storing unit 91 as feeder link quality information.

When the communication quality information of all the feeder beams is already acquired (Yes at step S1), the repeater-control-information generating unit 923 determines whether communication quality information of all the ground terminals 2-1 to 2-4 is already acquired (step S2). Communication quality information of all ground terminals can be calculated on the basis of reception power of each of user beams acquired from the communication satellite 1 and the number of the ground terminals 2-1 to 2-4 under communication in the user beam. Alternatively, the communication quality information of all the ground terminals can be acquired by acquiring, from the ground terminals 2-1 to 2-4, through the communication satellite 1, the ground base stations 3-1 to 3-3, and the ground network 8, reception power of signals received by the ground terminals from the communication satellite 1.

When the communication quality information of all the ground terminals 2-1 to 2-4 is not acquired yet (No at step S2), the repeater-control-information generating unit 923 repeats step S2. When the communication quality information of all the ground terminals 2-1 to 2-4 is already acquired (Yes at step S2), the repeater-control-information generating unit 923 determines whether requested C/Ns of all the ground terminals 2-1 to 2-4 are already acquired (step S3). As explained above, the requested C/N can be acquired from the ground terminals or can be calculated on the basis of the communication schemes of the ground terminals. When the requested C/Ns of all the ground terminals 2-1 to 2-4 are not acquired yet (No at step S3), the repeater-control-information generating unit 923 repeats step S3.

When the requested C/Ns of all the ground terminals 2-1 to 2-4 are already acquired (Yes at step S3), the repeater-control-information generating unit 923 calculates line margins of all the ground terminals (step S4). The line margins are differences between communication C/Ns, which are C/Ns during communication, of the ground terminals, and the requested C/Ns, that is, values obtained by subtracting the requested C/N from the communication C/Ns. When the communication C/Ns are higher than the requested C/Ns, the line margins have positive values. As the communication C/Ns are higher, that is, as communication quality is higher, the line margins are larger. On the other hand, when the communication C/Ns are lower than the requested C/Ns, the line margins have negative values. As the communication C/Ns are lower, the absolute values of the line margins are larger. The communication C/Ns can be calculated by, for example, a procedure explained below.

(1) Measuring electric power of a band in which a signal is present. A value of the measurement is represented as C+N.
(2) Measuring electric power of a band in which a signal is absent. A value of the measurement is represented as N.

The communication C/Ns are calculated using the measurement values. Alternatively, the communication C/Ns can also be calculated by representing electric power measured in a time when a signal is present as C+N and representing electric power measured in a time when a signal is absent as N.

The repeater-control-information generating unit 923 numbers the ground terminals in ascending order of the line margins (step S5). Specifically, the repeater-control-information generating unit 923 numbers the ground terminals to give a number 1 to a ground terminal having the smallest line margin and give a number 2 to a ground terminal having the second smallest line margin. Note that the sizes of the line margins refer to a size relation that takes into account plus and minus signs. That is, when a line margin is minus, the line margin is smaller than a line margin of 0. When line margins are negative values, the line margin having the larger absolute value is smaller.

The repeater-control-information generating unit 923 carries out allocation in the case without diversity transmission (step S6). The allocation in the case without diversity transmission is allocation of feeder beams to up-user-link signals performed when diversity transmission, that is, duplication of up-user-link signals is not performed. As a method of the allocation in the case without diversity transmission, any method can be adopted. However, as explained above, for example, the allocation can be performed on the basis of the requested C/Ns and the propagation loss of each of the feeder beams. Subsequently, the repeater-control-information generating unit 923 initializes a variable n of a repetition loop indicating terminal numbers, which are numbers of the ground terminals (step S7). Subsequently, the repeater-control-information generating unit 923 carries out loop processing for allocating the ground terminals to the diversity transmission in ascending order of the terminal numbers. A condition for ending the loop processing is that, as explained below, the processing is performed concerning all the terminals or resources for diversity transmission in the communication satellite 1 are exhausted.

As the loop processing, first, the repeater-control-information generating unit 923 determines whether n is equal to or smaller than the number of terminals, that is, the number of all ground terminals (step S8). When n is equal to or smaller than the number of terminals (Yes at step S8), the repeater-control-information generating unit 923 determines whether resources for diversity transmission are present (step S9). The resources for diversity transmission are, for example, a frequency band allocatable as a down-feeder-link signal of each of feeder beams of the repeater 30 of the communication satellite 1 and transmission power of the feeder beam. For example, when frequency bands allocatable as down-feeder-link signals are absent concerning all the feeder beams, the resources for diversity transmission are absent. Even if there is vacancy in a frequency band of a down-feeder-link signal, when transmission power of a feeder beam exceeds an upper limit, the feeder beam cannot be allocated to the ground terminals. When there is a feeder beam, transmission power of which is equal to or smaller than the upper limit and in which an allocatable frequency band is present, the repeater-control-information generating unit 923 determines that the resources for diversity transmission are present.

When the resources for diversity transmission are present (Yes at step S9), the repeater-control-information generating unit 923 allocates a terminal n, that is, a ground terminal, a terminal number of which is n, to the diversity transmission (step S10). The allocation to the diversity transmission means that an up-user-link signal of the terminal n is duplicated and transmitted using free resources for diversity transmission. Note that the number of signals arrangeable in feeder beams depends on propagation losses of the individual feeder beams and allowed transmission power. Therefore, at step S10, the repeater-control-information generating unit 923 only has to allocate the ground terminals to arrange more signals to feeder links having high quality on the basis of these kinds of information within a range of the allowed transmission power. Subsequently, the repeater-control-information generating unit 923 sets n=n+1 (step S12) and returns to step S8.

When n is larger than the number of terminals at step S8 (No at step S8) and when the resources for diversity transmission are absent at step S9 (No at step S9), the repeater-control-information generating unit 923 generates repeater control information, transmits the repeater control information to the communication satellite 1 as a control command (step S11), and ends the processing. Specifically, at step S11, the repeater-control-information generating unit 923 generates switching rules on the basis of a result of the allocation in the case without diversity transmission at step S6 and a result of the allocation by the diversity transmission allocated by the loop processing at step S9 to step S10 and generates the switching rules as repeater control information including the switching rules.

Figure 7:
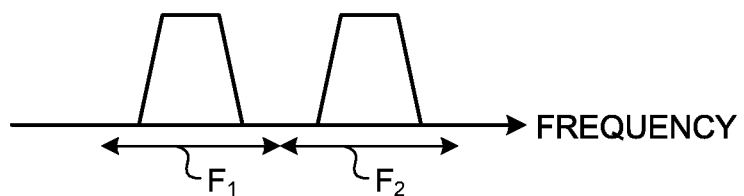
FIG. 7 is a diagram illustrating an example of the switching rules.

FIG. 7 is a diagram illustrating an example of switching rules in this embodiment. In the example illustrated in FIG. 7, the switching rules include a ground terminal, that is, identification information of the ground terminal, presence or absence of duplication, that is, presence or absence of duplication for an up-user-link signal of the ground terminal, a feeder beam, that is, identification information of the feeder beam, and a frequency band, that is, a frequency band in a signal transmitted by the feeder beam. The presence or absence of duplication in the control rules is information determined for each of up-user-link signals and indicating whether the up-user-link signal is duplicated. Concerning a ground terminal, presence or absence of duplication of which is "present", a plurality of sets of feeder beams and frequency bands are present. In FIG. 7, all frequency bands transmittable by feeder beams are divided into two frequency bands of $F_1$ and $F_2$. Frequency arrangement is indicated by designating $F_1$ or $F_2$. The number of divisions of the frequency bands is an example. The number of divisions of the frequency bands is not limited to two. A designation method for frequency arrangement is not limited to the example illustrated in FIG. 7. FIG. 7 is an example. The switching rules only have to include the same information as the information illustrated in FIG. 7. A specific form is not limited to the example illustrated in FIG. 7. Note that, in the above explanation, when the up-user-link signals are duplicated, one up-user-link signal is transmitted by two feeder beams. However, one up-user-link signal can be transmitted by three or more feeder beams.

Note that, in this embodiment, the line control device 9 on the ground generates the switching rules. However, a device that performs the same processing as the processing of the line control device 9 can be provided in the communication satellite 1. The communication satellite 1 can generate the switching rules.

In this embodiment, the line control device 9 determines on the basis of the requested C/N, that is, the communication quality of each of the ground terminals whether the duplication is performed. That is, information concerning presence or absence of duplication in the switching rules is determine on the basis of communication quality requested for a user link signal in the line control device 9 set on the ground. In the example illustrated in FIG. 7, the information concerning presence or absence of duplication is determined on the basis of a line margin, which is a difference between an estimated value of communication quality during communication of an up-user-link signal and communication quality requested for the up-user-link signal. However, the line control device 9 is not limited to this and can determine presence or absence of duplication such that up-user-link signals having requested C/Ns equal to or larger than a threshold are duplicated and up-user-link signals having requested C/Ns smaller than the threshold are not duplicated.

The repeater-control-information generating unit 923 transmits, as a control command, the repeater control information to the communication satellite 1 through the transmitting and receiving unit 94 and the control station 10. That is, the repeater control information including the information concerning presence or absence of duplication is transmitted from the line control device 9 to the communication satellite 1 via the control station 10. The transmitting and receiving unit 94 of the line control unit 9 or the control station 10 applies error correction encoding processing and modulation processing to the control command. Consequently, the control command is transmitted to the communication satellite 1 after the error correction encoding processing and the modulation processing are applied to the control command. The error correction encoding processing and the modulation processing can be any processing.

Note that the processing illustrated in FIG. 6 is executed again when various parameters configuring the communication system such as the number of ground terminals, communication schemes of the ground terminals, and communication quality of the ground terminals and feeder beams change by a fixed value or more.

Figure 8:
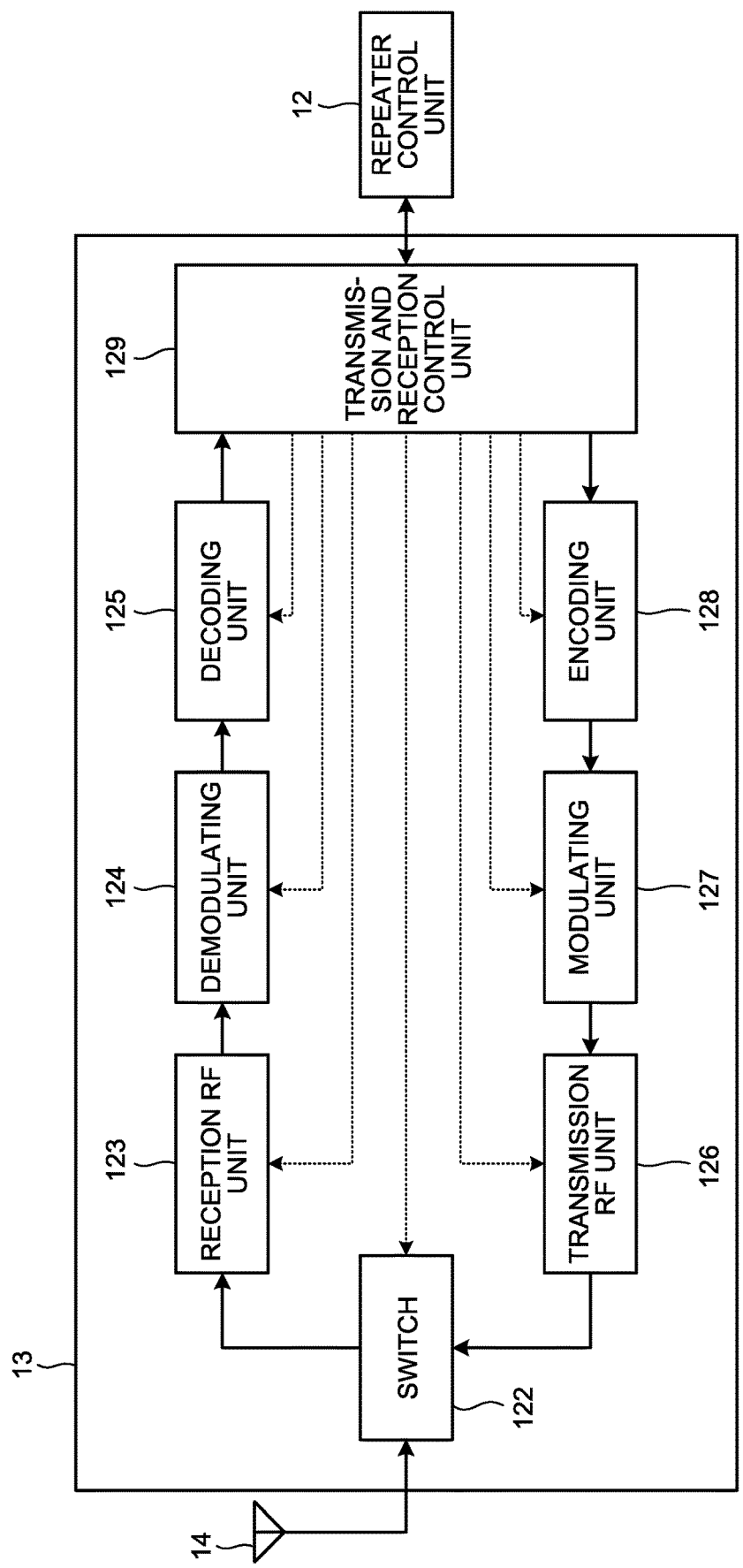
FIG. 8 is a diagram illustrating a configuration example of a transmitting and receiving unit for control of a communication satellite in the first embodiment.

Operation in the communication satellite 1 that receives the control command transmitted by the processing illustrated in FIG. 6 is explained. FIG. 8 is a diagram illustrating a configuration example of the transmitting and receiving unit for control 13 of the communication satellite 1 in this embodiment. The transmitting and receiving unit for control 13 includes a switch 122, a reception RF unit 123, a demodulating unit 124, a decoding unit 125, a transmission RF unit 126, a modulating unit 127, an encoding unit 128, and a transmission and reception control unit 129.

The control command transmitted from the control station 10 is received by the antenna 14. The switch 122 outputs a reception signal received by the antenna 14 to the reception RF unit 123. Note that, in FIG. 8, an example is illustrated in which transmission and reception are switched in a time division manner by the switch 122 using the antenna 14 as an antenna for transmission and reception. However, there is known, for example, a scheme for dividing transmission and reception with a frequency when the antenna for transmission and reception is used. In that case, a duplexer is used instead of the switch.

The reception RF unit 123 carries out analog signal processing such as amplification, filter processing, and frequency conversion on the reception signal and outputs the reception signal after the processing to the demodulating unit 124. The reception signal is converted from a high-frequency signal into a baseband signal by the frequency conversion in the reception RF unit 123. When an input interface of the demodulating unit 124 is an input interface of a digital signal, the reception RF unit 123 converts an analog signal, which is the baseband signal, into a digital signal and outputs the digital signal. Extraction of the baseband signal is sometimes realized by digital signal processing in the demodulating unit 124. In that case, the reception RF unit 123 converts the high-frequency signal into an intermediate frequency, converts a reception signal having the intermediate frequency into a digital signal, and outputs the digital signal to the demodulating unit 124. The demodulating unit 124 performs demodulation corresponding to modulation performed during transmission of the input reception signal to thereby restore a transmitted bit sequence, and outputs a restored signal to the decoding unit 125. The decoding unit 125 performs, on the signal output from the demodulating unit 124, decoding corresponding to error correction encoding performed during transmission and outputs the signal after the decoding to the transmission and reception control unit 129. Note that, when the error correction encoding is not performed during transmission, the decoding unit 125 is unnecessary.

The transmission and reception control unit 129 extracts the repeater control information from the signal input from the decoding unit 125 and outputs the repeater control information to the repeater control unit 12. The repeater control information includes the switching rules explained above.

Information indicating states of the units in the repeater 30, for example, reception power measured by the reception RF units 15-1 and 15-2 is input to the transmitting and receiving unit for control 13 via the repeater control unit 12. The transmission and reception control unit 129 outputs the information, that is, the transmission bit sequence input from the repeater control unit 12 to the encoding unit 128. When the error correction encoding is performed, the encoding unit 128 subjects the input bit sequence to error correction encoding and outputs the bit sequence to the modulating unit

127. The modulating unit 127 modulates the bit sequence subjected to the error correction encoding, converts the bit sequence into a transmission signal, and outputs the transmission signal to the transmission RF unit 126. The transmission RF unit 126 carries out analog signal processing on the input transmission signal and transmits the analog signal via the switch 122 and the antenna 14. Operation state control of the components in the transmitting and receiving unit for control 13 is also performed by the transmission and reception control unit 129. Note that control lines for the components on the inside are represented by dotted lines in FIG. 8.

Figure 9:
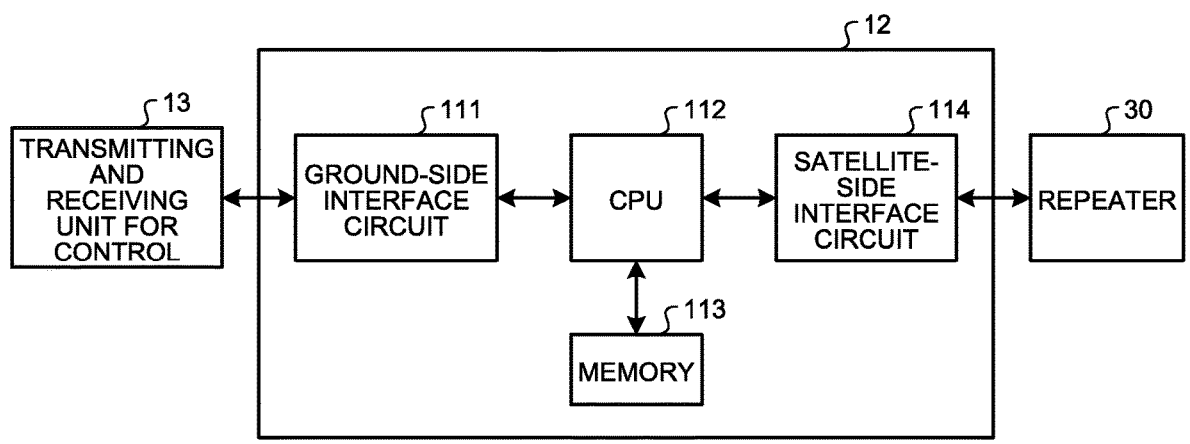
FIG. 9 is a diagram illustrating a repeater control unit in the first embodiment.

FIG. 9 is a diagram illustrating a configuration example of the repeater control unit 12. The repeater control unit 12 includes a ground-side interface circuit 111, a central processing unit (CPU) 112, a memory 113, and a satellite-side interface circuit 114. The ground-side interface circuit 111 performs, on the repeater control information transmitted from the transmitting and receiving unit for control 13, format conversion or the like for input to the CPU 112 and inputs the repeater control information to the CPU 112. The CPU 112 executes a repeater control program stored in the memory 113 to thereby convert the input relay control information into a signal for control interface of the repeater 30 while storing the relay control information, an intermediate value of a process of processing, and the like in the memory 113. For example, relay control information transmitted from the ground includes, as pairs, information indicating the components inside the repeater 30 and control parameters of individual components corresponding to the components. As the conversion executed by the CPU 112, the CPU 112 interprets the pairs and converts the relay control information into control signals for the components in the repeater 30. For example, switching rules are indicated to the switch 18 as the control parameters. The satellite-side interface circuit 114 converts control signals to the components in the repeater 30 into electric signals and inputs the electric signals to the corresponding components of the repeater 30.

As explained above, the repeater control unit 12 transmits a state of the repeater 30, for example, reception power measured by the reception RF units 15-1 and 15-2 to the line control device 9 through the ground base stations 3-1 to 3-3 and the ground network 8. In this case, the satellite-side interface circuit 114 converts the state of the repeater 30 input as an electric signal into a digital signal that can be input to the CPU 112 and inputs the digital signal to the CPU 112. The CPU 112 converts the signal input from the repeater 30 into a format of telemetry transmitted to the ground. The ground-side interface circuit 111 converts the information, which is converted into the form for transmission to the ground by the CPU 112, into a format that can be input to the transmitting and receiving unit for control 13 and inputs the information to the transmitting and receiving unit for control 13.

The memory is, for example, a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disc, a mini disc, or a digital versatile disk (DVD).

Figure 10:
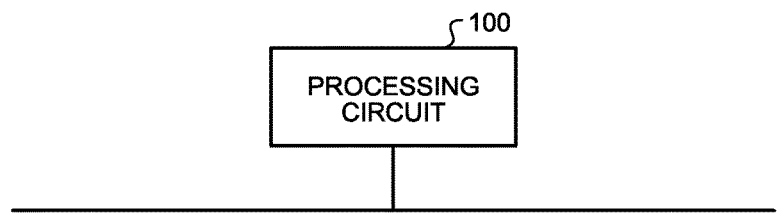
FIG. 10 is a diagram illustrating a configuration example of a processing circuit in the first embodiment.

Note that the example is explained in which the conversion processing in the repeater control unit 12 is realized by software using the CPU 112 and the memory 113. However, the conversion processing in the repeater control unit 12 can be realized by dedicated hardware. In this case, in the repeater control unit 12, the CPU 112 and the memory 113 are a processing circuit 100 illustrated in FIG. 10. FIG. 10 is a diagram illustrating a configuration example of the processing circuit 100 in the first embodiment. The processing circuit 100 is, for example, a single circuit, a composite circuit, a programmed processor, a parallel-programmed processor, an application specific integrated circuit (ASIC), a field programmable gate array (FPGA), or a combination of the forgoing.

The hardware configuration example of the repeater control unit 12 is explained above with reference to FIG. 9. A hardware configuration other than the repeater control unit 12 is explained below. Among the components illustrated in FIG. 2, the components other than the repeater control unit 12 can be configured by an electronic circuit that performs analog processing or hardware that performs dedicated processing. Alternatively, a part of the components illustrated in FIG. 2 can be realized by a control circuit including a CPU. The components realized by the dedicated hardware are realized by the processing circuit 100 illustrated in FIG. 10. The processing circuit 100 is a single circuit, a composite circuit, a programmed processor, a parallel-programmed processor, an ASIC, an FPGA, or a combination of the forgoing.

Figure 11:
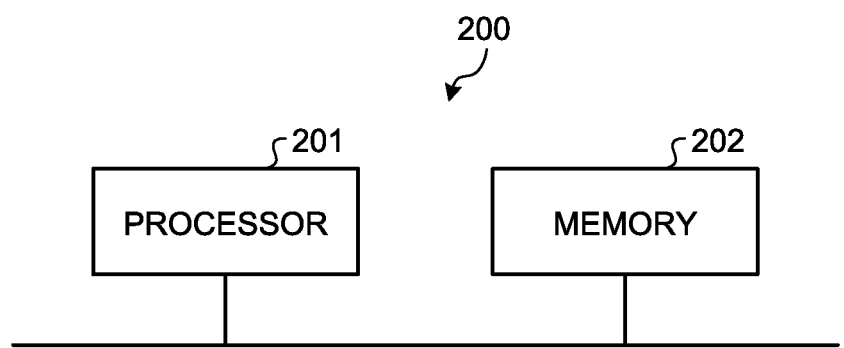
FIG. 11 is a diagram illustrating a control circuit in the first embodiment.

When a part of the components illustrated in FIG. 2 are realized by a control circuit including a CPU, the control circuit is, for example, a control circuit 200 having a configuration illustrated in FIG. 11. FIG. 11 is a diagram illustrating a configuration example of the control circuit 200 in the first embodiment. As illustrated in FIG. 11, the control circuit 200 includes a processor 201 such as a CPU and a memory 202. When a part of the components illustrated in FIG. 2 are realized by the control circuit 200, the part of the components are realized by the processor 201 reading and executing programs stored in the memory 202 corresponding to processing of the part of the components illustrated in FIG. 2. The memory 202 is used as a temporary memory in the processing carried out by the processor 201.

The calculating unit 92 in the line control device 9 can be realized as dedicated hardware or can be realized by software. When the calculating unit 92 is realized as the dedicated hardware, the calculating unit 92 is the processing circuit 100 illustrated in FIG. 10. When the calculating unit 92 is realized by the software, the calculating unit 92 is a processor such as a CPU. The calculating unit 92 is realized by the CPU executing a program for realizing processing by the calculating unit 92 stored in the storing unit 91, which is a memory. The storing unit 91 is used as a temporary memory in processing carried out by the CPU that realizes the calculating unit 92.

As explained above, in the satellite communication system according to the first embodiment of the present invention, presence or absence of implementation of site diversity, that is, presence of absence of duplication of user link signals is determined. User link signals corresponding to ground terminals having high requested communication quality are preferentially distributed to the ground base stations and transmitted. Therefore, it is possible to prevent deterioration in communication efficiency and prevent deterioration in use efficiency of a ground base station and a feeder link band while improving unavailability of feeder links. Therefore, an effect of reducing cost of the entire satellite communication system is obtained.

Second Embodiment

Figure 12:
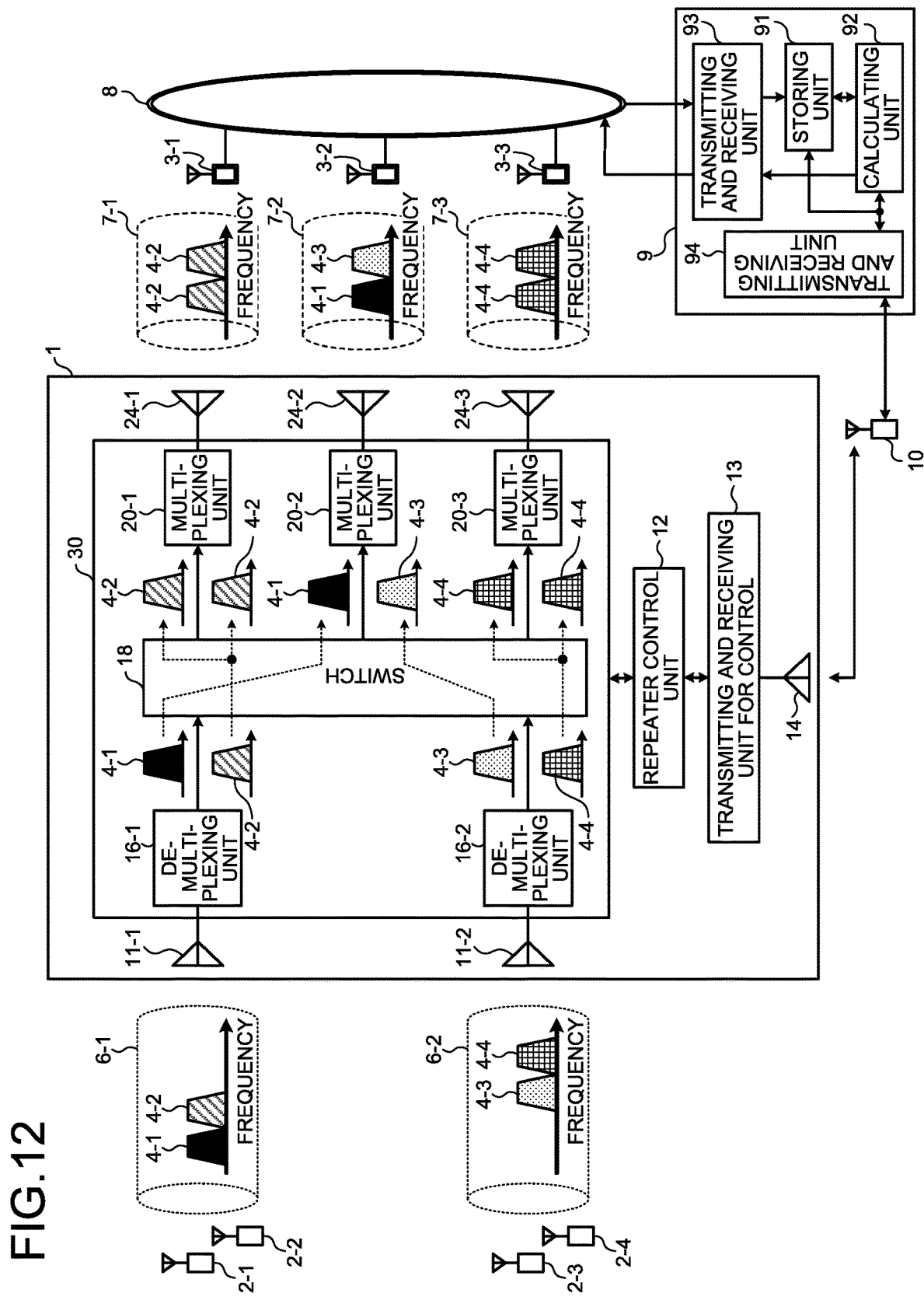
FIG. 12 is a diagram illustrating a relay method in a satellite communication system in a second embodiment.
Figure 13:
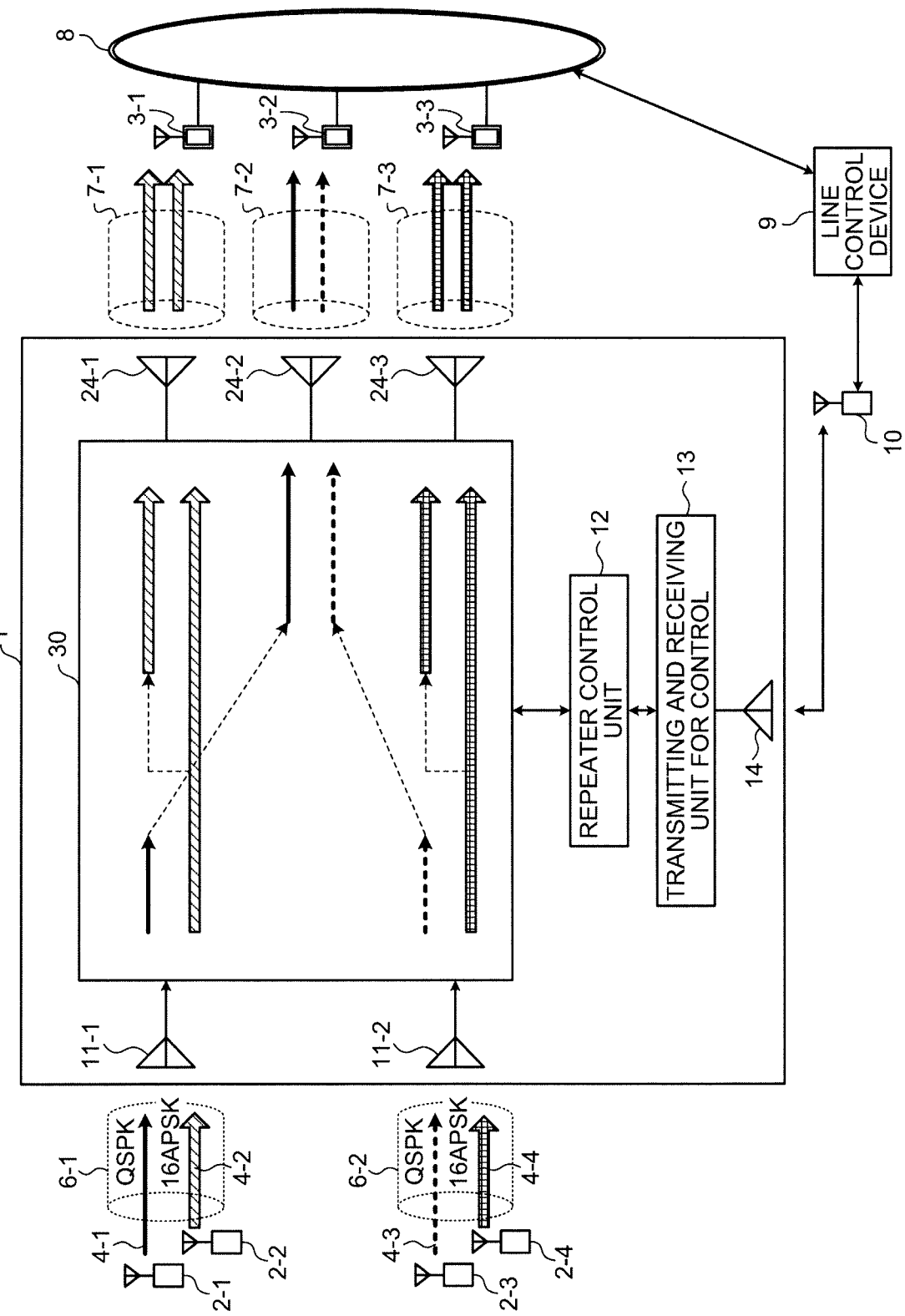
FIG. 13 is a diagram illustrating the relay method in the satellite communication system in the second embodiment.

FIG. 12 and FIG. 13 are diagrams illustrating a relay method in a satellite communication system according to a second embodiment of the present invention. FIG. 12 is a diagram illustrating a detailed operation in the repeater 30 together with frequency bands. FIG. 13 is a diagram conceptually illustrating destinations of up-user-link signals. The configuration of the satellite communication system in this embodiment and the configurations of devices configuring the satellite communication system are the same as the configurations in the first embodiment. Differences from the first embodiment are explained below.

In the first embodiment, the diversity effect is obtained by extracting, on the communication satellite 1, the up-user-link signals selected on the basis of the requested communication quality and simultaneously relaying the up-user-link signals to the ground base stations. In the first embodiment, processing including transmission and reception of information among the ground base stations for, for example, simultaneously demodulating information among the ground base stations that perform site diversity and selecting an appropriate result among demodulation results is additionally required.

In the second embodiment, the up-user-link signals of the ground terminals 2-1 to 2-4 are duplicated on a frequency axis of a feeder beam and transmitted to a single ground base station rather than being distributed to a plurality of ground base stations. That is, in the second embodiment, an up-user-link signal and a duplicated signal of the up-user-link signal are allocated to different frequency bands of the same feeder beam. The ground base station combines and demodulates the up-user-link signal and the duplicated signal. Consequently, demodulation result collation among the ground base stations is unnecessary. Therefore, in this embodiment, the line control device 9 generates switching rules in the procedure illustrated in FIG. 6. However, in the allocation of the ground terminals at step S10, the line control device 9 allocates a plurality of up-user-link signals obtained by duplicating one up-user-link signal to a single feeder beam. Therefore, feeder beams corresponding to the up-user-link signals cannot be determined until the number of up-user-link signals to be duplicated is determined. Therefore, in the second embodiment, at step S6, allocation of feeder beams corresponding to the up-user-link signals is not performed. The remaining resources remaining when frequency bands in feeder beams are allocated to all the up-user-link signals are calculated. For example, it is assumed that frequency bands transmitted by the feeder beams are divided into two of $F_1$ and $F_2$. In this example, if three feeder beams can be used, six (=3×2) frequency bands can be used as resources. When one up-user-link signal corresponds to one frequency band, six up-user-link signals in total can be transmitted. When a total number of user link signals is four when duplication is not performed, the remaining resources are two frequency bands.

In the second embodiment, after allocation to up-user-link signals to be duplicated is carried out, at step S11, allocation to up-user-link signal not to be duplicated is carried out.

In examples illustrated in FIG. 12 and FIG. 13, as in the example illustrated in FIG. 3 in the first embodiment, the up-user-link signals 4-1 and 4-3 are generated by QPSK and the up-user-link signals 4-2 and 4-4 are generated by 16APSK. The up-user-link signal 4-2 is duplicated by the switch 18. Duplicated two up-user-link signals 4-2 are arranged in different frequency bands of transmission signals transmitted by the feeder beam 7-1. The up-user-link signal 4-4 is duplicated by the switch 18. Duplicated two up-user-link signals 4-4 are arranged in frequency bands of transmission signals transmitted by the feeder beam 7-3. The up-user-link signals 4-1 and 4-3 are not duplicated and are arranged in different frequency bands of transmission signals transmitted by the feeder beam 7-2.

The ground base station 3-1 and the ground base station 3-3 can improve communication quality by combining two waves having different frequency bands, that is, two signals obtained by duplicating the same up-user-link signal. The ground base station 3-1 and the ground base station 3-3 can perform coherent combination of signals before demodulation and then demodulate the signal. If an error correction code is also used, it is also possible to use a scheme for individually demodulating the signals with two waves, generate soft decision values, and combine the soft decision values to perform error correction decoding. That is, the ground base station 3-1 and the ground base station 3-3, which receive a signal including an up-user-link signal and a duplicated signal from the communication satellite 1, can combine and demodulate a plurality of same signals included in the received signal. When the up-user-link signal is subjected to error encoding, the ground base station 3-1 and the ground base station 3-3 can respectively demodulate the same signals included in the received signal and combine and decode soft decision values obtained by the demodulation.

Note that, in the method according to the second embodiment, because the duplicated two waves are arranged in the same feeder beam in the repeater 30 of the communication satellite 1, a frequency deviation of the two waves is reduced. Therefore, the coherent combination before the demodulation can be easily realized. Operation in this embodiment other than the operation explained above is the same as the operation in the first embodiment.

Note that, when there is no limitation on power density of feeder beams, signals having high requested quality are extracted by the repeater according to the first embodiment. The requested quality can be sometimes satisfied by selectively increasing only this transmission power gain. However, in general, a plurality of up-user-link signals are frequency-multiplexed on individual feeder beams. Therefore, even if only signal power of a specific user link signal is increased, the signal power is sometimes buried in frequency-multiplexed other signals. On the other hand, in the satellite communication system according to the second embodiment, signal power is improved by changing a frequency bandwidth without changing power frequency density of a transmission signal transmitted from the communication satellite 1. Therefore, even when another signal is a strong signal, it is possible to prevent a desired signal from being buried in the other signal.

As explained above, in the satellite communication system according to the second embodiment of the present invention, the same effects as the effects in the first embodiment are obtained. Further, because an improvement effect of communication quality is obtained in a single ground base station, it is possible to realize a further reduction in the cost of a ground facility compared with the first embodiment.

The configurations explained in the embodiments indicate an example of contents of the present invention. The configurations can be combined with other publicly-known technologies. A part of the configurations can also be omitted or changed in a range not departing from the spirit of the present invention.

REFERENCE SIGNS LIST 1 communication satellite
2-1 and 2-2 ground terminal
3-1 to 3-3 ground base station 9 line control device
6-1, 6-2 user beam
7-1 to 7-3 feeder beam
8 ground network
10 control station
11-1, 11-2 user beam antenna
12 repeater control unit
13 transmitting and receiving unit for control
14 antenna
24-1 to 24-3 feeder beam antenna
30 repeater
91 storing unit
92 calculating unit
300 satellite communication system

The invention claimed is:

1. A communication satellite comprising:
a plurality of first antennas capable of respectively forming different first beams; and
a plurality of second antennas capable of respectively forming different second beams for transmitting signals to a ground base station,
the communication satellite including, for each of the first antennas, a demultiplexing circuit to divide a reception signal received by the first beam into user link signals, which are signals for each of ground terminals at transmission sources,
the communication satellite including, for each of the second antennas, a multiplexing circuit to multiplex input signals and output the signals to the second antennas, and
the communication satellite including a switcher to duplicate, on the basis of information determined for each of the user link signals and indicating whether the user link signal is duplicated, the user link signal for which duplication is instructed by the information, generate a duplicated signal, and output the duplicated signal and the user link signal to the multiplexing circuits corresponding to second beams respectively allocated to the duplicated signal and the user link signal,
wherein the information is information determined, in a line controller set on a ground, on the basis of communication quality requested for the user link signal, the information being transmitted from the line controller to the communication satellite.

2. The communication satellite according to claim 1, wherein the user link signal and the duplicated signal of the user link signal are allocated to different frequency bands of a same second beam.

3. The communication satellite according to claim 1, wherein the information is information determined, in a line controller set on a ground, on the basis of a difference between an estimated value of communication quality during communication of the user link signal and communication quality requested for the user link signal, the information being transmitted from the line controller to the communication satellite.

4. The communication satellite according to claim 1, wherein the user link signal and the duplicated signal of the user link signal are allocated to different second beams.

5. A line controller that generates control information transmitted to a communication satellite including a plurality of first antennas respectively capable of forming different first beams and a plurality of second antennas respectively capable of forming second beams for transmitting signals to ground base stations,
the line controller comprising a controller to determine, for each of user link signals, which are signals of each of the ground terminals transmitted from the ground terminal to the communication satellite, information concerning whether the user link signal is duplicated in the communication satellite and determine a second beam for transmitting a signal to the ground base station in a communication satellite allocated to the user link signal and a duplicated signal, which is a signal obtained by duplicating the user link signal,
the communication satellite including, for each of the first antennas, a demultiplexing circuit to divide a reception signal received by the first beam into the user link signals,
the communication satellite including, for each of the second antennas, a multiplexing circuit to multiplex input signals and output the signals to the second antenna, and
the communication satellite including a switcher to duplicate the user link signal for which duplication is instructed by the information, generate a duplicated signal, and output the duplicated signal and the user link signal to the multiplexing circuits corresponding to second beams respectively allocated to the duplicated signal and the user link signal,
wherein the line controller determines the information on the basis of communication quality requested for the user link signal and transmits the information to the communication satellite.

6. A satellite communication system comprising:
a communication satellite;
a line controller to generate control information transmitted to the communication satellite; and
a ground base station,
the line controller including a controller to determine, for each of user link signals, which are signals of each of the ground terminals transmitted from the ground terminal to the communication satellite, information concerning whether the user link signal is duplicated in the communication satellite and determine a second beam for transmitting a signal to the ground base station in a communication satellite allocated to the user link signal and a duplicated signal, which is a signal obtained by duplicating the user link signal,
the communication satellite including:
a plurality of first antennas respectively capable of forming different first beams; and
a plurality of second antennas respectively capable of forming different second beams for transmitting signals to the ground base station,
the communication satellite including, for each of the first antennas, a demultiplexing circuit to divide a reception signal received by the first beam into the user link signals,
the communication satellite including, for each of the second antennas, a multiplexing circuit to multiplex input signals and output the signals to the second antenna, and
the communication satellite including a switcher to duplicate the user link signal for which duplication is instructed by the information, generate a duplicated signal, and output the duplicated signal and the user link signal to the multiplexing circuits corresponding to second beams respectively allocated to the duplicated signal and the user link signal,
wherein the line controller determines the information on the basis of communication quality requested for the user link signal and transmits the information to the communication satellite.

7. The satellite communication system according to claim 6, wherein the line controller determines the information on the basis of a difference between an estimated value of communication quality during communication of the user link signal and communication quality requested for the user link signal and transmits the information to the communication satellite.

8. The satellite communication system according to claim 6, wherein the user link signal and the duplicated signal of the user link signal are allocated to different second beams.

9. The satellite communication system according to claim 8, wherein a first ground base station, which is the ground base station that receives a signal including the user link signal or the duplicated signal from the communication satellite, demodulates the signal received from the communication satellite and, when determining that an error is included in a first demodulation result, acquires, from a second ground base station, which is another ground base station that receives, from the communication satellite, a same signal as the signal received from the communication satellite, a second demodulation result, which is a result obtained by demodulating the signal received from the communication satellite in the second ground base station.

10. The satellite communication system according to claim 8, wherein a first ground base station, which is the ground base station that receives a signal including the user link signal or the duplicated signal from the communication satellite, acquires, from a second ground base station, which is another ground base station that receives, from the communication satellite, a same signal as the signal received from the communication satellite, a second signal, which is a signal received in the second ground base station and combines and demodulates the first signal and the second signal.

11. The satellite communication system according to claim 6, wherein the user link signal and the duplicated signal of the user link signal are allocated to different frequency bands of the same second beam.

12. The satellite communication system according to claim 11, wherein the ground base station, which receives a signal including the user link signal and the duplicated signal from the communication satellite, combines and demodulates a plurality of same signals included in the signal.

13. The satellite communication system according to claim 11, wherein the ground base station, which receives a signal including the user link signal and the duplicated signal from the communication satellite, demodulates each of a plurality of same signals included in the signal and combines and decodes soft decision values obtained by the demodulation.

* * * * *